United States Patent [19]

Mizoguchi et al.

[11] 4,145,468

[45] Mar. 20, 1979

[54] COMPOSITE FABRIC COMPRISING A NON-WOVEN FABRIC BONDED TO WOVEN OR KNITTED FABRIC

[75] Inventors: Takahisa Mizoguchi; Hiroshi Henmi; Tsukasa Shima; Yasuhiko Yamashita; Shinichi Uematsu, all of Nobeoka; Kazuo Kawamura, Kyoto, all of Japan

[73] Assignee: Asahi Kasei Kogyo Kabushiki Kaisha, Osaka, Japan

[21] Appl. No.: 764,132

[22] Filed: Jan. 31, 1977

[30] Foreign Application Priority Data

Jan. 30, 1976 [JP] Japan ................................. 51-8386
May 28, 1976 [JP] Japan ................................. 51-61285
Aug. 27, 1976 [JP] Japan ................................. 51-101686
Sep. 16, 1976 [JP] Japan ................................. 51-109803

[51] Int. Cl.$^2$ ............................................. D06N 3/00
[52] U.S. Cl. ..................................... 428/239; 28/104; 428/233; 428/246; 428/252; 428/253; 428/284; 428/287; 428/290; 428/299; 428/302; 428/303; 428/425; 428/904
[58] Field of Search ............... 428/233, 234, 235, 236, 428/238, 239, 246, 247, 252, 253, 284, 286, 287, 298, 299, 300, 301, 302, 303, 904, 289, 290, 425; 28/104, 107, 159, 167, 105

[56] References Cited

U.S. PATENT DOCUMENTS 3,932,687  1/1976  Okamoto et al. .................... 428/904

*Primary Examiner*—James J. Bell
*Attorney, Agent, or Firm*—Sprung, Felfe, Horn, Lynch & Kramer

[57] ABSTRACT

A composite fabric useful as a substratam sheet for artificial leather is composed of a woven or knitted fabric constituent and at least one non-woven fabric constituent consisting of numerous fibrous bundles composed of a plurality of individual fibers arranged parallel to each other, and varying in the number of the individual fibers from which the bundles are formed, and numerous individual fibers independent from each other and from the fibrous bundles, the individual fibers and the fibrous bundles being randomly distributed and entangled with each other to form a body of non-woven fabric, and the non-woven fabric constituent and woven or knitted fabric constituent being superimposed and bonded together, to form a body of composite fabric, in such a manner that portions of the individual fibers and the fibrous bundles of the non-woven fabric constituent penetrate into the inside of the woven or knitted fabric and are entangled with a portion of fibers in the woven or knitted fabric constituent.

15 Claims, 18 Drawing Figures

Fig. 1 (NATURAL LEATHER)
Fig. 2 (PRIOR ART)
Fig. 3A

COMPOSITE FABRIC COMPRISING A NON-WOVEN FABRIC BONDED TO WOVEN OR KNITTED FABRIC

The present invention relates to a composite fabric and a process for producing the same. More particularly, the present invention concerns a composite fabric consisting of at least one non-woven fabric constituent and a woven or knitted fabric constituent firmly bonded to the non-woven fabric constituent and being usable as a substratum sheet for artificial leather, and a process for producing the same.

It is well known that artificial leather is produced by impregnating a substratum sheet consisting of a non-woven fabric with an elastic polymer material, for example, polyurethane and butadiene-styrene rubber. It is also known that in order to produce the artificial leather useful as a material for clothing, a special substratum sheet having a high softness and a high resistance to breakage is required. Accordingly, there have been various attempts for obtaining the above-mentioned type of the special substratum sheet for the artificial leather. For example, Japanese Patent Application Publication No. 48583(1974) (corresponding to U.S. Pat. No. 3,932,687) discloses a non-woven fabric composed of fibrous bundles of extremely fine fibers prepared from special composite fibers, that is, islands-in-sea type composite fibers. Also, Japanese Patent Application Publication No. 6261(1976) discloses a non-woven fabric which is composed of fibrous bundles of extremely fine fibers or porous fibers having a honeycomb-like cross-sectional profile which have been prepared by providing composite fibers from a blend of at least two types of component polymers and removing at least one component polymer from the composite fibers.

The above-mentioned type of the substratum sheets for artificial leather were derived from the knowledge that natural leather comprises numerous fibrous bundles of fine collagen fibers which are randomly entangled with each other. That is, the known types of non-woven fabrics are produced by forming a precursor non-woven fabric from islands-in-sea type composite fibers or a blend of polymer composite fibers, and; dissolving away the sea constituent polymer from the islands-in-sea type composite fibers or at least one component polymer from the blend of polymer composite fibers, so as to obtain fibrous bundles of the island constituent polymer fibers or the remaining component polymer fibers. Accordingly, in the known type of the non-woven fabric, the fibrous bundles are maintained in the regular bundle form, in spite of the random entanglement thereof. Further, due to the fact that the removal of the component (constituent) polymer from the composite fibers is effected after the composite fibers are converted into the non-woven fabric, the resultant non-woven fabric has a relatively low density. However, it should be noted that natural leather is composed of various collagen fiber bundles varying in thickness, in other words, with varying numbers of collagen fibers in the bundle. In the collagen fiber bundles in natural leather, a trunk bundle having a relatively large thickness is branched to form a plurality of primary branch bundles, each primary branch bundle is branched to form a plurality of secondary branch bundles and each of the branch bundles are branched to form a plurality of tertiary branch bundles. Accordingly, it is obvious that the inside structure of the above-mentioned conventional type of the non-woven fabrics is quite different from that of natural leather. The artificial leather produced by using, as a substratum sheet thereof, the conventional non-woven fabric has a relatively low softness and density and, therefore, a different feel from that of natural leather.

Further, the conventional types of non-woven fabrics have a relatively low resistance to break, that is, tensile strength and tear strength, and a relatively low dimensional stability. Accordingly, the artificial leather produced from the conventional non-woven fabric has a relatively low resistance to break and dimensional stability.

An object of the present invention is to provide a composite fabric usable as a substratum sheet for artificial leather having a proper softness and being useful as a material for clothing, and a process for producing the same.

Another object of the present invention is to provide a composite fabric usable as a substratum sheet for artificial leather having a high resistance to break and dimensional stability, and a process for producing the same.

Still another object of the present invention is to provide a composite fabric usable as a substratum sheet for artificial leather having a nubuck-like surface covered with a pile layer consisting of extremely fine fibers and fibrous bundles existing at a high density, and a process for producing the same.

The above-mentioned objects can be attained by the composite fabric of the present invention which comprises a woven or knitted fabric constituent and at least one non-woven fabric constituent consisting of numerous fibrous bundles composed of a plurality of individual fibers arranged parallel to each other, and varying in the number of said individual fibers from which said bundles are formed, and numerous individual fibers independent from each other and from said fibrous bundles, said individual fibers and said fibrous bundles being randomly distributed and entangled with each other to form a body of non-woven fabric, and said non-woven fabric constituent and woven or knitted fabric constituent being superimposed and bonded together, to form a body of composite fabric, in such a manner that portions of said individual fibers and said fibrous bundles of said non-woven fabric constituent penetrate into the inside of said woven or knitted fabric and are entangled with a portion of fibers in said woven or knitted fabric constituent.

The composite fabric of the present invention has a high density and resistance to break, and an excellent dimentional stability, compressibility and recovery on compression. Further, it can be converted into an artificial leather having a nubuck-like surface covered with a pile layer formed by extremely fine fibers and fibrous bundles, and having a high density. The artificial leather produced from the composite fabric of the present invention has a high resistance to break and dimensional stability and a proper softness, and feels like natural leather.

The composite fabric of the present invention is produced by the process of the present invention which comprises:

providing a fibrous web constituent composed of numerous composite staple fibers, each consisting of a fibrous bundle of a plurality of fibers which adhere to each other, said composite staple fibers each being capable of being divided into a plurality of thin fibrous bundles and into individual fibers;

forming a multilayer precursor sheet composed of a woven or knitted fabric constituent and at least one said fibrous web constituent superimposed on each other, and jetting numerous fluid streams ejected under a high pressure toward the surface of said fibrous web constituent of said precursor sheet while allowing a portion of said composite staple fibers to be divided into thin fibrous bundles varying in the number of individual fibers in said bundles, and into individual fibers independent from each other and said thin fibrous bundles;

allowing said thin fibrous bundles, said individual fibers and the remaining composite staple fibers to entangle with each other in order to convert said web constituent into a non-woven fabric constituent, and;

allowing portions of said individual fibers, said thin fibrous bundles and said remaining composite staple fibers to penetrate into the inside of said woven or knitted fabric constituent and to entangle with a portion of the fibers in said woven or knitted fabric constituent in order to firmly bond said non-woven fabric constituent to said woven or knitted fabric constituent.

Further features and advantage of the present invention will be apparent from the following description, with reference to the accompanying drawings, wherein:

FIG. 1 is a cross-sectional model view of an internal structure of natural leather;

FIG. 2 is an explanatory view of a cross-sectional profile of a conventional artificial leather using fibrous bundles of extremely fine fibers;

FIG. 3A is an explanatory view of a cross-sectional profile of a three constituent composite fabric of the present invention;

Figure 3B:
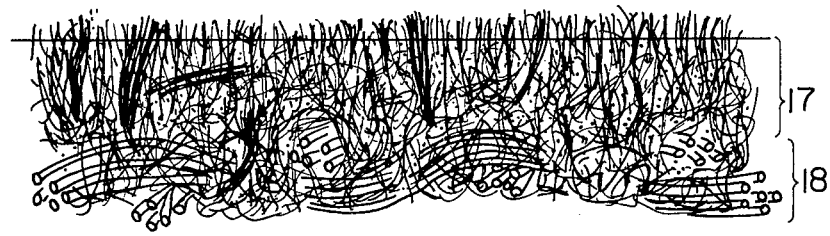
FIG. 3B is an explanatory view of a cross-sectional profile of a two constituent composite fabric of the present invention.

Referring to FIG. 1 which shows the internal structure of natural leather, numerous collagen fiber bundles, which vary in thickness, are entangled with each other. That is, the collagen fiber bundles 1 located in the back side surface portion of natural leather have a relatively large thickness and are composed of relatively thick individual collagen fibers. However, the grain side surface portion of natural leather is composed of numerous very thin collagen fiber bundles and very thin individual collagen fibers.

Accordingly, in a suede leather which is prepared by buffing the back side surface of the leather, the buffed surface is covered with numerous piles consisting of the relatively thick collagen fiber bundles spaced from each other. Compared with suede leather, in a nubuck leather which is produced by buffing the grain side surface of the leather, the piles covering the buffed surface consist of very thin collagen fiber bundles and very thin collagen individual fibers standing close to each other. Consequently, in order to obtain an artificial leather having a nubuck-like buffed surface, it is important that the piles consisting of very thin fiber bundles and very fine individual fibers, are formed in a high density.

Referring to FIG. 2, showing an internal structure of a conventional artificial leather, numerous fiber bundles, having a relatively large thickness, are randomly entangles, and the piles 4 formed on the buffed surface thereof are spaced from each other. That is, the piles are formed at a relatively low density. Accordingly, a portion of an elastic polymer 5 impregnated between the fiber bundles 3 is sometimes not completely covered with the piles. This results in an artificial leather of low quality.

Referring to FIG. 3A, showing an internal structure of an artificial leather made from a composite fabric of the present invention, a woven or knitted fabric constituent 11 is embedded between an upper non-woven fabric constituent 12 and a lower non-woven fabric constituent 13, and a pile layer 14 is formed on an upper surface of the upper non-woven fabric constituent 12. In each non-woven fabric constituent, there are numerous fibrous bundles 15 varying in the thickness, in other words, with varying numbers of individual fine fibers in the bundle, and individual fine fibers 16 which have been formed by splitting the fibrous bundles. These various fibrous bundles 15 and the individual fibers 16 are randomly distributed and randomly entangled with each other to form a body of non-woven fabric. Further, portions of the fibrous bundles and the individual fibers penetrate from the non-woven fabric constituents 12 and 13 into the inside of the knitted or woven fabric constituent 11, and entangle with a portion of the fibers in the woven or knitted fabric constituent 11 to firmly bond the non-woven fabric constituents 12 and 13 to the woven or knitted fabric constituent 11, and to form a body of a composite fabric.

Referring to FIG. 3B, a non-woven fabric constituent 17 is formed on a woven or knitted fabric constituent 18 and both the constituents are firmly bonded to each other in the same manner as mentioned above.

The above-mentioned entanglement of the fibrous bundles varying in thickness thereof and individual fine fibers with each other, results in non-woven fabric constituents having an internal structure like that of natural leather, and in a high compressibility and recovery on compression of the resultant composite fabric. The individual fibers which have been formed by splitting the fibrous bundles are effective in enhancing the softness of the resultant composite fabric and cooperate with the woven or knitted fabric constituent to enhance the density of the composite fabric. That is, by using the composite fabric of the present invention, it is possible to obtain an artificial leather having a density of about 0.4 g/cm$^3$ or more, which is the same as that of natural leather. Such high density artificial leather can not be produced from the conventional non-woven fabric. In the composite fabric of the present invention, it is preferable that the amount of individual fine fibers be larger than that of the fibrous bundles, because the individual fine fibers are easier to entangle with the others and to penetrate into the woven or knitted fabric constituent than the fibrous bundles. This is because of the larger flexibility and smaller thickness of the individual fine fibers than the fibrous bundles, and because the entanglement of the individual fine fibers is stronger than that of the fibrous bundles. Further, a large amount of the individual fine fibers can penetrate into the inside of the woven or knitted fabric constituent and entangle with the fibers in the woven or knitted fabric constituent. When an individual fine fiber penetrates from the non-woven fabric constituent into the inside of the woven or knitted fabric constituent, and entangles at its an end portion with one or more fibers in the woven or knitted fabric constituent, the end portion of the individual fine fiber is fixed in the entangling position. The other end portion of the individual fine fiber moves around the fixing point of the above-mentioned end portion and entangles with another individual fine fiber or a fibrous bundle in the non-woven fabric constituent. If a fibrous bundle is entangled at an end portion with the other end portion of the above-mentioned individual fine fiber, the other end portion of the fibrous bundle moves around the above-mentioned fixing point and entangles with another fibrous bundle or individual fine fiber.

The above-mentioned style of entanglement subsequently occurs, and an end of the resulting chains of the entangled fibrous bundles and the individual fine fibers are firmly anchored in the woven or knitted fabric constituent. Accordingly, the woven or knitted fabric constituent is very important to promote the production of the non-woven fabric constituent having a high density and a high dimensional stability, and the firm bonding of the non-woven fabric constituent to the woven or knitted fabric constituent is enhanced by the above-mentioned anchors.

Further, it is preferable that the fibrous bundles and the individual fine fibers penetrate into the inside of the woven or knitted fabric constituent at about a right angle to the surface of the composite fabric. Such penetration of the fibrous bundles and the individual fine fibers enhances the compressibility and the recovery on compression of the resultant composite fabric.

The artificial leather prepared from the composite fabric of the present invention can have a pile layer like that of a nubuck leather. That is, when the artificial leather is buffed, the substratum sheet consisting of the composite fabric of the present invention can form, on its surface, a smooth pile layer composed, in a high density, of the fibrous bundles and the individual fine fibers.

The composite fabric of the present invention has a feel to the hand of proper denseness. The term "a feel to the hand of proper denseness" refers to an all-comprehensive feel to the hand of a proper softness, a proper compressibility and a proper recovery on compression. That is, the proper softness, which is determined in accordance with the Method of ASTM D 1388-64, is 40 mm or less, the proper compressibility falls in a range from 15 to 40% and the proper recovery on compression is 80% or more.

If the composite fabric has a softness of 40 to 60 mm, it feels slightly stiff. The composite fabric having a softness of 60 mm or more feels stiff. The composite fabric having a compressibility of 40 to 80% is of a sponge-like feel. A compressibility lower than 15% results in a feel to the hand of substantially no elasticity of the composite fabric. If the composite fabric has a recovery on compression of 50% or less, this fabric feels poor in resiliency. The recovery on compression of 50 to 80% results in a feeling of slightly insufficient resiliency.

The term "fibrous bundle" used herein refers to a bundle of a plurality of individual fine fibers arranged in parallel to each other. The individual fine fibers in the bundle may be adhered to each other with or without adhesive or may be free in movement relative to each other. The fibrous bundle usable for the present invention is divisible into two or more thin fibrous bundles and into a plurality of individual fine fibers. The fibrous bundle includes the composite staple fibers consisting of a plurality of individual fine fibers and thin fibrous bundles divided from the composite staple fiber and varying in thickness. The composite staple fiber, which is thickest in the fibrous bundles in the non-woven fabric constituent, preferably has a denier of 1 to 200, more preferably, 2 to 60. The existance of fibrous bundles having too large a denier, results in a low density and a low softness of the resultant composite fabric. Further, fibrous bundles which are too thick cause an undesirable rough pile layer on the artificial leather.

The individual fine fibers from which the fibrous bundles are formed or which are formed by dividing the fibrous bundles, preferably should have a denier of 0.5 or less, more preferably, 0.005 to 0.5, or most preferably, 0.01 to 0.3. From individual fine fibers having a denier larger than 0.5, it is difficult to form an artificial leather having a high softness like that of natural leather. Further, individual fine fibers which are too thick result in a stiff pile layer formed on the resultant artificial leather. From individual fine fibers having a denier smaller than 0.01, it is also difficult to form an artificial leather having a high resiliency, and result in an undesirable pile layer in which the pile fibers lie down on the leather surface and entangle with each other due to the rigidity of the fibers being too low. The individual fine fibers of 0.01 to 0.3 denier are very effective for producing a nubuck-like artificial leather having a proper softness, a proper resiliency, a desirable writting effect, and an elegant appearance and feel. This artificial leather can, of course, be used as a material for clothing.

The fibrous bundles and the individual fine fibers are preferably in the form of staple fiber and preferably have a length of 15 mm or less, more preferably, 2 to 15 mm or most preferably, 3 to 10 mm. Fibrous bundles and individual fine fibers which are too long are not desired, because the excess length tends to reduce the amount of the entanglement of the fibrous bundles and the individual fine filament with each other. Therefore, a length which is too long results in a low density and a low resistance to break of the resultant composite fibers. Further, in order to produce an artificial leather having a density similar to that of the natural leather by using excessively long fibrous bundles, it is required to impregnate the composite fabric with a large amount of an elastic polymer. Such use of a large amount of polymer results in a high stiffness of the resultant artificial leather. Accordingly, fibrous bundles and individual fibers having a length of 15 mm or smaller are useful for producing the nubuck-like artificial leather having a dense pile layer and a smooth, fine texture.

The non-woven fabric constituent and the woven or knitted fabric constituent of the composite fabric of the present invention may be composed of viscose rayon fibers, cuprammonium rayon fibers, cellulose acetate fibers, polyamide fibers, polyester fibers, polyacrylic fibers, polyolefin fibers or the like. The non-woven fabric constituent and the woven or knitted fabric constituent may be composed of a mixture of two or more of the above-mentioned types of fibers, for example, a mixture of the viscose or cuprammonium rayon fibers and the polyamide fibers or a mixture of the polyester fibers and the polyamide fibers. The polyamide fibers may involve fibers of nylon 6, nylon 66, nylon 10, nylon 11, nylon 12, a copolymer of nylon 6 with nylon 66, a copolymer of nylon 6 with nylon 10, a copolymer of nylon 6 with isophthalamide, a copolymer of nylon 6 with polyoxyethylene-di-amine, a copolymer of nylon 66 with polyoxyethylene-di-amine, a blend polymer of nylon 66 and polyethyleneglycol, a blend of nylon 6 and polyethyleneglycol, a bland of nylon 6 or nylon 66 and at least one of the copolymers described above, and an aromatic polyamide such as polymethaphenylene tetraphthalamide and poly-N-methyl-phenylene tetraphthalamide.

The polyester fiber may be a fiber of polyethylene terephthalate, a polyethylene terephthalate-isophthalate copolymer, a polyethylene terephthalate-adipate copolymer, a polyethylene terephthalate-trimediate copolymer, a polyethylene terephthalate-sebacate copolymer, a poyethylene terephthalate-succinate copolymer, a polyethylene-diethylene glycol terephthalate copolymer, a polyethylene-ethylene glycol terephthalate copolymer or a mixture of two or more of the above-mentioned polymers.

The polyacrylic fiber may be a fiber of polyacrylonitrile, a copolymer of acrylonitrile with at least one member selected from methyl acrylate, methyl methacrylate and ethyl acrylate, or a mixture of two or more of the above-mentioned polymers.

The polyolefin fiber is a fiber of polyethylene, polypropylene or a mixture of polyethylene and polypropylene.

The woven or knitted fabric usable for the present invention is required to have spaces formed between the fibers or yarns, which spaces are large enough to receive the fibrous bundles or the individual fine fibers penetrated from the non-woven fabric constituent. The woven or knitted fabric preferably has a weight of 10 to 100 g/m$^2$, more preferably, 30 to 70 g/m$^2$. The woven or knitted fabric having a weight smaller than 10 g/m$^2$ is difficult to uniformly open and tends to be easily wrinkled. Further, with such thin fabric it is difficult to keep the fibrous bundles and the individual fine fibers penetrated into the fabric at a substantially right angle to the surface of the fabric. Accordingly, in the case where the thin woven or knitted fabric is used, it is difficult to obtain a composite fabric having a feel to the hand of proper denseness.

Figure 4:
FIG. 4 is an explanatory view of a cross-sectional profile of a precursor sheet for producing a three constituent composite fabric of the present invention.

With a woven or knitted fabric having a weight larger than 100 g/m$^2$, it is difficult for the fibrous bundles and the individual fine filaments to penetrate into the fabric and, therefore, is difficult to have the bundles and filaments firmly bonded to the non-woven fabric. If the high weight woven or knitted fabric stated above is used, the resultant composite fabric might have the internal structure as indicated in FIG. 4. In this drawing, a woven or knitted fabric 19 is interposed between two pieces of non-woven fabrics 20 and 21. However, the woven or knitted fabric is not bonded to the non-woven fabrics.

In order to produce the composite fabric having a relatively high softness, it is preferable that the woven or knitted fabric be composed of multifilament yarns having a denier of 70 or less, more preferably, 10 to 70.

The woven or knitted fabric usable for the present invention may be a weft knitted fabric, a warp knitted fabric such as tricot fabric, lace fabric, fancy knitted fabric, plain weave, twill weave, satin weave, or a fancy woven fabric. As stated above, it is important that the woven or knitted fabric has a weaving or knitting structure which allows the fibrous bundles and the individual fibers to penetrate into the inside of the fabric. Further, it is preferable that the fibers from which the woven or knitted fabric is formed have a denier of 3 or less, more preferably, 0.5 to 3. If the denier of the fibers is excessively large, the resultant composite fabric will create a high stiffness in the artificial leather prepared from the composite fabric.

In the preparation of the composite fabric of the present invention, generally, it is preferable that a woven or knitted fabric constituent be interposed between and firmly bonded to two random webs to be converted into the non-woven fabric constituents, as shown in FIG. 3A. However, the woven or knitted fabric constituent may be superimposed on and firmly bonded to a piece of random web to be converted into a non-woven fabric constituent, as shown in FIG. 3B. This type of composite fabric has the following special advantages.

1. It contains only a relatively small amount of the composite staple fibers, which are relatively expensive.
2. The thickness of the composite fabric is small.
3. It utilizes a pattern carried on the woven or knitted fabric constituent.
4. It utilizes a high bonding property of the outer surface of the woven or knitted fabric constituent to other articles.

In the constitution of the composite fabric of the present invention in which a woven or knitted fabric constituent is interposed between two non-woven fabric constituents, as shown in FIG. 3A, it is preferable that the proportion by weight of the woven or knitted fabric constituent to the composite fabric be 40% or less, preferably, 5 to 40%, or more preferably, 15 to 35%. If the above-mentioned proportion is more than 40%, in the other words, if the non-woven fabric constituents are excessively thin, the following disadvantages may occur.

1. Easy beakage of the non-woven fabric constituents. This breakage results in undesirable exposure of the woven or knitted fabric constituent to observation.
2. Undesirable woven or knitted fabric-like feel of the resultant composite fabric, due to an excessively high content of the woven or knitted fabric constituent in the composite fabric.

In the constitution of the composite fabric in which a woven or knitted fabric constituent is bonded to a non-woven fabric constituent, as shown in FIG. 3B, it is preferable that the proportion by weight of the woven or knitted fabric constituent to the composite fabric be 60% or less, more preferably, 5 to 60%. However, in order to obtain a composite fabric having a good feel, it is more preferable that the above-mentioned proportion be 15 to 40%. When the above-mentioned proportion is 15 to 40%, the resultant composite fabric has an excellent feel, which is created by the combination of a high resiliency and a proper flexibility of the composite fabric, and a high dimensional stability.

In the non-woven fabric constituent in the composite fabric of the present invention, it is preferable that the proportion by weight of the individual fine fibers to the fibrous bundles be 5% or more, more preferably, 20 to 85%. The higher the proportion by weight of the individual fine fibers, the higher the density of the resultant non-woven fabric constituent. Further, the high proportion by weight of the individual fine fibers in the non-woven fabric constituent results in a high proportion by number of the individual fine fiber piles to the fibrous bundle piles in the pile layer formed on the raised surface of the resultant artificial leather. This high proportion of the individual fine fiber piles results in a smooth fine textile with a raised surface. However, an excessively large proportion of the individual fine fibers in the non-woven fabric constituent may cause an undesirably small rigidity of the resultant composite fabric, due to small influence of the fibrous bundles which have relatively large rigidity. Accordingly, it is desirable that the non-woven fabric constituent be formed by a mixture of the individual fine fibers and the fibrous bundles in a proper proportion. The fibrous bundles may be a mixture of the remaining composite staple fibers and the fibrous thin bundles or may consist of the fibrous thin bundles only. That is, in order to obtain an artificial leather having a natural leather like feel, it is important that the non-woven fabric constituent be composed of various fibrous materials varying in thickness from that of the composite staple fibers to that of the individual fine fibers, and entangled three-dimensionally with each other.

The proportion by weight of the individual fine fibers to the fibrous bundles can be determined by the following method.

A scanning electron microscope is used at a magnification of 700 to take microscopic pictures of a non-woven fabric constituent at 20 cross-sectional profiles thereof. On each of the pictures, numerous ruled lines are drawn at intervals of 2 mm in the directions of the abscissa and ordinate. In each picture, the sections occupied by the individual fibers are colored red. Thereafter, each picture is cut along the ruled lines. The red-colored sections are collected so as to separate them from the non-colored sections. The total weight of the collected red sections is determined. Separately, the total weight of the non-colored sections is determined. The proportion by weight of the individual fine fibers to the fibrous bundles in the non-woven fabric constituent is indicated by an average proportion of the total weight of the red-colored sections to the total weight of the non-colored sections of the 20 pictures.

When the artificial leather made from the composite fabric of the present invention is raised, the resultant raised surface has a valuable nubuck-like pile layer. That is, the pile layer is formed by numerous individual fine fibers and fibrous bundles varying in thickness at a high density. The density of the piles depends on the length of the composite staple fibers. That is, when a non-woven fabric constituent is produced from a predetermined amount of composite staple fibers, the shorter the composite staple fibers, the larger the number of the ends of the composite fibers contained in the non-woven fabric constituent, the larger the number of the piles formed on the raised surface and the higher the density of the piles. The artificial leather produced by using the composite fabric of the present invention can have a smooth pile surface like the raised grain side surface of natural nubuck leather.

The piles in the pile layer are entangled at their end portions with the individual fine fibers or fibrous bundles located inside of the composite fibers. Therefore, the piles have a high resistance to slipping off from the fabric.

In the preparation of the artificial leather, the composite fabric of the present invention is impregnated with a bonding polymer such as polyurethane, butadiene-styren rubber, butadiene-acrylonitrile rubber, polyamine acids, and an acrylic adhesive materials. This allows the empty spaces in the fabric to be filled with the polymer. This impregnation is effective to increase the resistance to breakage of the resultant artificial leather. When the impregnation is effected with an elastic polymer, the resultant artificial leather has a natural leather like feel and resistance to break. When the elastic polymer is used in a relatively small amount, the resultant artificial leather has a relatively high softness. However, when the elastic polymer is used in a relatively large amount, an artificial leather having a relatively high stiffness is obtained. Both of the above-mentioned artificial leathers are suitable to be utilized for clothing. This is due to the high density structure of the composite fabric of the present invention even before the impregnation with the elastic polymer. That is, the composite fabric allows the elastic polymer to impregnate it in a relatively small amount. This is due to the fact that the sum of the empty spaces of the composite fabric of the present invention is a relatively small volume. In comparison with this, the sum of the empty spaces of the conventional non-woven fabric, which is composed of only fibrous bundles having a relatively large thickness, is a relatively large volume. When the empty spaces of the conventional non-woven fabric are filled with a relatively small amount of the elastic polymer, the resultant artificial leather has a relatively small thickness and a paper-like feel. While, when the empty spaces of the conventional non-woven fabric are filled with a relatively large amount of the elastic polymer, the resultant product is a rubber-like sheet.

The above-mentioned facts will be illustrated with reference to FIGS. 5A through 5F of the drawings.

Figure 5A:
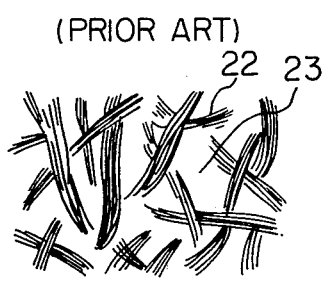
FIG. 5A is an explanatory view of an internal structure of a conventional non-woven fabric in which numerous conventional fibrous bundles, each composed of a plurality of fine fibers, are randomly entangled with each other.

In FIG. 5A, a conventional non-woven fabric is constituted from numerous conventional fiber bundles 22 entangled with each other and contains numerous empty spaces 23 formed between the fiber bundles 22. Since the density of the fiber bundles 22 is relatively low, the total volume of the respective volumes of the empty spaces 23 is very small. Further, each empty space formed between the fiber bundles 22 has a relatively large volume. Accordingly, when the conventional non-woven fabric is impregnated with an elastomer, the resultant particles of the elastomer formed in the empty spaces each has a relatively large size.

Figure 5B:
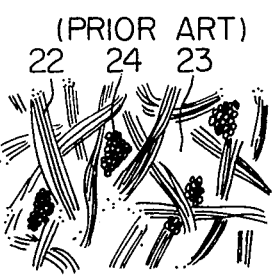
FIG. 5B is an explanatory view of an internal structure of a conventional non-woven fabric in which numerous conventional fibrous bundles, each composed of a plurality of fine fibers, are entangled with each other, and a relatively small amount of an elastic polymer exists between the fibrous bundles.

FIG. 5B shows an internal structure of the non-woven fabric of FIG. 5A impregnated with a relatively small amount of an elastic polymer. That is, in FIG. 5B, some of the spaces 23 are filled with particles 24 of the elastic polymer. When such a structure of the impregnated non-woven fabric is pressed, the spaces 23 are reduced in volume, and the fiber bundles are bonded with the elastic polymer in the pressed condition. Therefore, the pressing results in a permanent reduction of thickness of the impregnated non-woven fabric and a paper-like sheet is obtained. In order to avoid the above-mentioned phenomenon, the elastic polymer may be deposited in the form of a cubic network in the non-woven fabric. However, in this case, the resultant product is a spongy sheet which is greatly different in feel from natural leather.

Figure 5C:
FIG. 5C is an explanatory view of an internal structure of a conventional non-woven fabric in which numerous conventional fibrous bundles, each consisting of a plurality of fine fibers, are entangled with each other, and a relatively large amount of an elastic polymer exists between the fibrous bundles.

In FIG. 5C, a large amount of particles 24 of the elastic polymer is distributed in the spaces 23 of the non-woven fabric. This type of sheet has a rubber sheet-like feel.

Figure 5D:
FIG. 5D is an explanatory view of an internal structure of an embodiment of the composite fabric of the present invention.

FIG. 5D shows an internal structure of the composite fabric of the present invention in which a woven or knitted fabric constituent is interposed between and firmly bonded to two non-woven fabric constituents. In this internal structure, the distribution of the individual fibers and the fibrous bundles exhibit a high density. The total volume of the respective volumes of the empty spaces in the composite fabric is relatively small. Accordingly, the volume of each of the empty spaces is also relatively small. Therefore, when the empty spaces are impregnated with an elastomer, numerous small-sized particles of the elastomer are distributed in the empty spaces. This feature gives a natural leather-like feel to the resultant artificial leather.

Figure 5E:
FIG. 5E is an explanatory view of an internal structure of an embodiment of the composite fabric of the present invention impregnated with a relatively small amount of an elastic polymer.
Figure 5F:
FIG. 5F is an explanatory view of an embodiment of the composite fabric of the present invention impregnated with a relatively large amount of an elastic polymer.

In FIG. 5E, a relatively small amount of an elastic polymer is deposited in the empty spaces in the composite fabric of FIG. 5D. In FIG. 5F, the composite fabric of FIG. 5D is impregnated with the elastic polymer in an amount smaller than that in FIG. 5E. However, due to the relatively small total volume of the empty spaces, the amount of the elastic polymer which can be impregnated in the composite fabric is not very large. Furthermore, due to the relatively small size of each of the empty spaces, the size of the elastomer particles formed in the empty spaces is relatively small, and thereby, the resultant product has a relatively high softness and is useful as a material for clothing. That is, the artificial leather containing a relatively small amount of the elastic polymer is very soft and useful as a material for women's suits or one-piece dresses. The artificial leather containing a relatively large amount of the elastic polymer is relatively stiff and useful as a material for blazer coats and shoes.

Further, it should be noted, that the conventional non-woven fabric as shown in FIGS. 5A, 5B and 5C can be merely converted into a suede or velour-like artificial leather having a relatively low density of piles. However, the composite fabric of the present invention can be converted into a nubuck-like artificial leather which has a high density in the piles and is more valuable than the suede of velour-like artificial leather.

Preferably, the composite fabric of the present invention has a density of 0.2 to 0.5 g/cm$^3$; more preferably, 0.25 to 0.40 g/cm$^2$. An excessively low density results in an excessively high softness, a low dimensional stability and low tensile and tear strengths. Further, the low density of composite fabric has a low recovery on compression. Therefore, when this type of composite fabric is immersed in a liquid containing the elastic polymer and squeezed, the fabric is unevenly impregnated with the elastic polymer, and fixed with the elastic polymer in the squeezed condition. That is, the resultant artificial leather has a paper-like feel. On the other hand, when the composite fabric has an excessively high density, for example, more than 0.5 g/cm$^3$, it is difficult to uniformly impregnate the fabric with the elastic polymer and the resultant artificial leather has an undesirably high stiffness.

The composite fabric of the present invention can be converted into an artificial leather having a density like natural leather, which has a density of about 0.4 g/cm$^3$, by impregnating it with a relatively small amount of the elastic polymer.

Figure 6:
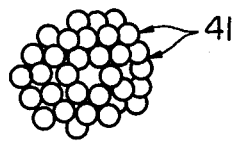
FIG. 6 is a cross-sectional explanatory view of a composite staple fiber usable for the present invention, said staple fiber being composed of a plurality of fine fibers adhering to each other.

In the composite fabric of the present invention, the composite staple fibers may have a cross-sectional profile as shown in FIG. 6. In this drawing, a plurality of fine fibers 41 spontaneously adhere to each other without adhesive. The composite staple fiber in which a plurality of fine fibers spontaneously adhere to each other without using adhesive can be produced by the following methods.

For example, in the case where the fine fibers are produced by a wet-spinning process, a polymer solution is extruded through a spinneret having a plurality of spinning orifices and the extruded streams of the polymer solution is immersed in a coagulating solution. When the polymer solution streams are incompletely coagulated so as to form semi-solidified filaments, the semi-solidified filaments, each having an adhesive surface, are bundled by means of a bundling guide so as to allow the adhesive surfaces of the semi-solidified filaments to contact and adhere to each other. The bundle of the spontaneously adhering filaments are, then, completely coagulated and cut to form the composite staple fibers.

In the case where the fine fibers are produced by way of flush spinning, for example, in the case of polyamide fine fibers, the spun fine filaments are treated with steam and bundled to form a bundle of the fine filaments adhering to each other without adhesive.

The adhering strength should be in an extend that the fine fibers in the composite staple fibers are not divided from each other when the composite staple fibers are converted into a random web. The adhering strength can be adjusted by way of the conventional technique.

Figures 7A, 7B, 7C:
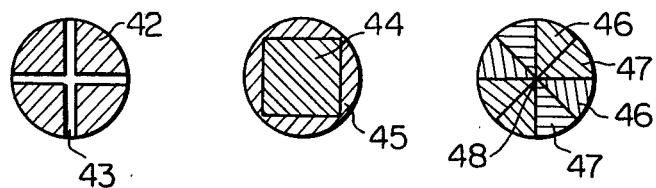
FIG. 7A is a cross-sectional explanatory view of a composite staple fiber usable for the present invention, said staple fiber consisting of two types of polymers.
FIG. 7B is a cross-sectional explanatory view of another composite staple fiber usable for the present invention, said composite staple fiber consisting to two types of polymers.
FIG. 7C is a cross-sectional explanatory view of still another composite staple fiber usable for the present invention, said composite staple fiber consisting of two types of polymers.

The composite staple fiber usable for the present invention may have a cross-sectional profile, for example, as shown in FIGS. 7A to 7C, and may be splittable into a plurality of component fine fibers which consist of different polymers having no or very poor adhering property to each other.

In the cross-sectional profile of a composite fiber shown in FIG. 7A, four segments 42 are incorporated with a cross-shaped segment 43 into a body of a composite fiber. The segments 42 consist of a polymer different from the polymer forming the segment 43. The polymer of the segments 42 has no or very poor adhering property to the polymer of the segment 43. Accordingly, the composite fiber of FIG. 7A can be divided into four fine fibers of segment 42 and a fine fiber of segment 43.

In FIG. 7B, a square segment 44 is embedded within a circular segment 45. The polymer forming the segment 44 has no or very poor adhering property to the polymer of segment 45. Accordingly, when the segment 45 is broken at its thinest portions by an impacting operation for the composite fiber, the composite fibers can be divided into four fine fibers formed from the segment 45 and a fine fiber from the segment 44.

In FIG. 7C, two different polymers respectively form a segments 46 and the other segments 47 arranged alternately around a center 48. The polymer of the segments 46 has no or very poor adhering property to the polymer of the segment 47.

The above-mentioned type of splittable composite fiber can be produced from a polyamide and a polyester in accordance with the process disclosed in Japanese Patent Application No. 13476/1975. This type of splittable composite fiber may be produced from an acrylonitrile polymer and polyvinyl alcohol. The composite staple fiber usable for the present invention may be produced by bundling and adhering a plurality of fine fibers with an adhesive or a sizing agent.

The composite staple fiber preferably has a denier of 1 to 200, more preferably 2 to 60. The composite staple fibers having a denier of 2 to 60 are easily converted into a random web. The individual fibers divided from the composite staple fibers can have any denier, but preferably have a denier of 0.5 or less. The individual fine fibers larger than 0.5 denier are undesirable for forming artificial leather having a proper softness and a natural leather-like feel. The individual fine fibers having a denier larger than 0.5 result in relatively stiff piles on the resultant artificial leather.

The direct preparation of the composite fabric from the individual fine fibers of 0.5 denier or smaller is very difficult. That is, the conventional non-woven fabrics usable as a material for clothing are produced by providing a web from staple fibers having a denier of 1 to 10, by utilizing the paper-making process or carding process and needle-punching the web. However, the individual fine fibers of smaller than 0.5 denier are not proper for the carding process and needle-punching process, due to the easy entanglement of the fibers with each other during the process or easy depositing of the fibers being easily deposited on the carding engine. Also, it is well-known that fine fibers of smaller than 0.5 denier are difficult formed into a web by utilizing the paper-making process unless the fine fibers have a length of 1 mm or less. However, the very short fine fibers result in a web having a very poor resistance to break.

In the present invention, the composite staple fibers are easily converted into a random web by a conventional web-making process without difficulty. The composite staple fibers may have a length of 15 mm.

In order to produce the random web, it is desirable that the fibers be in the form of staple fibers. If continuous filaments are used for forming a random web of the present invention, it is difficult to convert the random web into a non-woven fabric constituent and to firmly bond the web to the woven or knitted fabric constituent due to the poor entangling property thereof. These difficulties are not encountered with the composite staple fibers of the present invention. Especially, the composite staple fibers having a length of about 3 to 10 mm are suitable for producing the nubuck-like artificial leather.

The composite staple fibers usable for the present invention may be made of any fiber-forming polymer. That is, regenerated cellulose, cellulose acetate, polyamides, polyesters, polyacrylonitrile, polyethylene, polypropylene and copolymers of two or more of the monomers forming the above-mentioned polymers, are usable for the composite staple fibers.

In the present invention, the random web of the composite staple fiber can be produced by utilizing the paper-forming process. This process is very valuable for producing a random web having a uniform and very small thickness at a very high speed of several hundred meters/minutes.

The composite fabric of the present invention may be produced from a precursor sheet consisting of a woven or knitted fabric superimposed on one piece of random web or interposed between two pieces of random webs by either of the following two methods.

In the first method, the precursor sheet is impacted with numerous fluid jets having a high speed. The fluid jets are formed by ejecting a fluid, for example water, under a high pressure through numerous ejecting orifices. The orifices are not limited to those having a circular cross-sectional profile. However, an orifice having a circular cross-sectional profile is most popular. The cross-sectional profile of the orifice preferably has an inside diameter of 0.5 mm or smaller, more preferably, 0.05 to 0.3 mm. When the inside diameter is larger than 0.5 mm, the fluid jets ejected from the orifices tend to remove the fibers from the precursor sheet and, therefore, the desired composite fabric can not be obtained. The fluid jets may be in the form of a straight thin stream or in the form of a cone. the fluid may be ejected under a pressure of 10 kg/cm$^2$ to 100 kg/cm$^2$. When the precursor sheet is relatively thin, a relatively low pressure is used to produce the fluid jets. For example, if the precursor sheet is of a thickness of 1 mm or less, the fluid is ejected under a pressure of 50 kg/cm$^2$ or less.

The distance from the ejecting end of the orifices to the surface of the precursor sheet to be impacted is preferably 100 mm or less, more preferably, 20 mm – 60 mm. A distance larger than 100 mm results in an insufficient impact on the precursor sheet of the fluid jets. The fluid is preferably water from the point of view of economy.

In the second method for producing the composite fabric of the present invention, the random web of the composite staple fibers is converted into the non-woven fabric by way of high pressure fluid jet impacting or needle-punching. In this converting process, the composite staple fibers are divided into thin fibrous bundles varying in thickness and into individual fine fibers. Thereafter, the thus formed individual fine fibers and thin fibrous bundles are randomly entangled with each other, and with the remaining the composite staple fibers. After that, a woven or knitted fabric is firmly bonded to one or two pieces of the above-prepared non-woven fabric or fabrics by the above-mentioned method.

The composite fabric of the present invention can be converted into a nubuck-like artificial leather by the conventional artificial leather producing process. Since the composite fabric of the present invention has a high density and a high recovery on compression, even when the composite fabric is impregnated with a solution or emulsion of the elastic polymer and squeezed with a mangle, the squeezed composite fabric can recover its thickness to the condition before the squeeze operation. Accordingly, the resultant artificial leather is thick enough for various clothing and has a proper softness.

The above-mentioned second method may be carried out in such a manner that a woven or knitted fabric is incorporated with one or two pieces of random web or webs by the afore-mentioned method. The random web is, then, converted into a non-woven fabric without bonding the non-woven fabric to the woven or knitted fabric. Thereafter, the woven or knitted fabric is bonded to the non-woven fabric to form a body of composite fiber. In order to convert the random web into the non-woven fabric without bonding it to the woven or knitted fabric, the random web may be needle-punched many times with needles with no barbs, or the random web is covered with a metal net and impacted through the net with numerous fluid jets ejected through numerous orifices having an inside diameter of, for example, 0.1 mm under a high pressure of, for example, 20 to 50 kg/cm$^2$. In the latter method, the impacting force of the fluid jets are weakened by contact with the net, and each fluid jet is divided into a plurality of thin streams. Due to the relatively weak impacting force of the fluid jets, the composite staple fibers are merely divided into thin fibrous bundles and into individual fine fibers. However, the fibrous bundles and the individual fine fibers can not penetrate into the inside of the woven or knitted fabric, and entangle with the fibers in the woven or knitted fabric.

The above-mentioned penetration and entanglement of the fibrous bundles and the individual fine fibers can be effected by the needle-punching method or the impacting method with the high pressure fluid jets.

In the case where the needle-punching method is applied to the precursor sheet, it is necessary to prevent the breakages of fibers in both the woven or knitted fabric constituent and the non-woven fabric constituent.

In the impacting method with the high pressure fluid jets, the pressure of the fluid jets may be locally varied so as to form a pattern on the impacted surface of the composite fabric.

The non-woven fabric constituent preferably has a density of 0.20 g/cm$^3$ –0.05 g/cm$^3$. When the density is smaller than 0.20 g/cm$^3$, the resultant artificial leather has a paper-like or fabric-like feel.

When the impacting method with the fluid jets is used, a random web having a thickness of 1 mm or less can be converted into a non-woven fabric without breakage of the random web. However, the needle-punching process can not be applied to such a thin random web having a thickness of 1 mm or less. Thereafore, in the case where the needle-punching method is utilized, a relatively thick non-woven fabric is produced and, thereafter, sliced along the surface thereof to form two or more thin non-woven fabrics. The slicing operation is a difficult operation and produces a large amount of waste. Therefore, this method is disadvantageous from the point of view of economy. Further, since the needle-punching method forms numerous holes on the composite fabric surface, it is necessary to slice away the surface layer from the composite fabric. This slicing also results in an economical disadvantage.

The composite fabric of the present invention can be converted into an artificial leather by impregnating the fabric with a solution, emulsion or latex of an elastic polymer and drying the impregnated fabric. The elastic polymer may be selected from polyurethane, synthetic rubbers such as butadiene-acrylonitrile rubber and butadiene-styrene rubber, elastic polyvinyl chlorides, elastic acrylic polymers, polyaminoacids, and elastic copolymers of two or more monomers for the above-mentioned polymers.

The artificial leather produced from the composite fabric of the present invention may be raised by using any conventional raising machine, for example, a card clothing raising machine and the so-called sander. In the card clothing raising machine, a card clothing in which numerous fine needles stand at a high density on a thin rubber sheet, is wound on a rotatable drum. In the raising operation, the drum is rotated at a high speed in such a manner that the top ends of the needles are brought into contact with the surface of the artificial leather to be raised so as to convert the fibrous bundles and the individual fine fibers located in the surface portion of the artificial leather into piles.

The sander involves a drum sander in which sand paper is wound on a rotetable drum or a belt sander in which an endless belt consisting of a sand paper is rotated. In both types of sanders, the sand paper is brought into contact with the surface of the artificial leather to raise the surface.

The card clothing raising machine is suitable to form relatively long piles and the sander is proper to produce relatively short piles. Accordingly, the raising machine suitable for obtaining the nubuck-like artificial leather is the sander rather than the card clothing raising machine. However, the artificial leather may be raised by concurrently using the sander and the card clothing raising machine. Further, the raised artificial leather may be subjected to a brushing or shearing process to improve the quality of the raised pile surface of the artificial leather.

The surface of the artificial leather may also be coated with a thin layer of a polyurethane. In this case, a grain side layer is formed on the artificial leather.

The composite fabric of the present invention, and the artificial leather produced from the composite fabric can be dyed or printed using a conventional method. Further, the artificial leather may be subjected to a crumpling process to make the artificial leather softer.

The features and advantages of the present invention are further illustrated by the examples set forth hereinafter, which are not intended to limit the scope of the present invention in any way.

In the following examples and comparison examples the properties of the composite fabric and the artificial leather were respectively determined in accordance with the following methods.

1. Tensile strength and breaking elongation

Testing specimens, each having a length of 20 cm and a width of 1 cm, were taken from the fabric to be tested. The full width of the end portions, of 5 cm lengths, of the specimen was gripped, and the specimen was stretched with an autograph until the specimen was broken. The maximum breaking load and the elongation at break was measured.

2. Tear strength

Figure 8A:
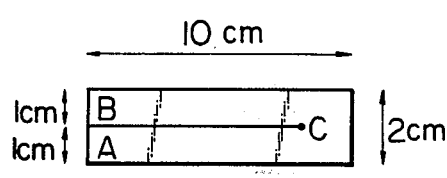
FIG. 8A is an explanatory view of a specimen of the composite fabric of the present invention, for testing the tear strength thereof.
Figure 8B:
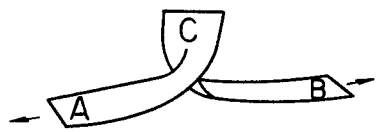
FIG. 8B is an explanatory view of a specimen of the composite fabric of the present invention in a posture for testing a tear strength thereof.

Testing speciments, each having a length of 10 cm and a width of 2 cm, as indicated in FIG. 8A, were taken from the fabric to be tested. The specimen was cut from an end thereof to a point C in FIG. 8A. The end portions A and B of 5 cm lengths, of the specimen were gripped and stretched with an autograph, in the manner as shown by arrows in FIG. 8B, until the specimen was broken. The maximum load at break was measured.

3. Sewing strength

Figure 9:
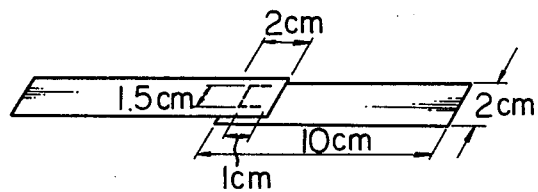
FIG. 9 is an explanatory view of a specimen of the composite fabric of the present invention for testing its sewing strength.

Testing specimens, having a length of 10 cm and a width of 2 cm, were taken from the fabric to be tested. Two pieces of the specimens were overlapped and sewed together, in the manner indicated in FIG. 9 with a sewing machine, using a polyester sewing yarn of 50 metric count and a sewing needle of 11 number count, at a stitch number of 12 stitches/3 cm. The full width of the end portions, of 5 cm lengths, of the sewed specimens was gripped and streched with an autograph until the sewed portion was broken. The maximum breaking load was measured.

4. Recovery on elongation

Testing specimens, 20 cm long and 1 cm wide, were taken from the fabric to be tested. A top end portion, of 5 cm length, of the specimen was gripped and fixed at its full width. The lower end portion, of 5 cm length, of the specimen was gripped and loaded with a weight of 1.0 kg. After the specimen was kept under the loaded condition for 10 minutes, the length of the specimen was measured. The specimen was released from the load and kept in the non-loaded condition for 10 minutes. After that, the length of the specimen was again measured. The recovery on elongation was determined in accordance with the following equality:

$$\text{Percent recovery} = \frac{L_1 - L_2}{L_1 - L_0} \times 100$$

wherein $L_0$ is the original length of the specimen before loading, $L_1$ is the length of the specimen after loading, and $L_2$ is the length of the specimen after releasing the load.

5. Compressibility and recovery on compression

Testing specimens, 10 cm long and 10 cm wide, were taken from the fabric to be tested. Ten pieces of the specimens were superimposed, and a thin metal plate having the same size as the specimen and a weight of 50 g was placed on the superimposed specimens. The total thickness ($t_0$) of the superimposed specimens was measured. A weight of 10 kg was placed on the metal plate in such a manner that the superimposed specimens were uniformly compressed. The specimens were kept in the compressed condition for 30 minutes. Thereafter, the total thickness ($t_1$) of the compressed superimposed specimens was measured. The weight was removed and the superimposed specimens were kept in the non-weighted condition for 30 minutes. Thereafter, the total thickness ($t_2$) of the superimposed specimens was again measured.

The compressibility and recovery on compression were determined in accordance with the following eaualities.

$$\text{Compressibility (\%)} = \frac{t_0 - t_1}{t_0} \times 100$$

$$\text{Percent Recovery} = \frac{t_0 - t_2}{t_0 - t_1} \times 100$$

6. Resistance to abrasion

Testing specimens, 200 mm long and 50 mm wide, were taken from the fabric to be tested. The specimens were set on a CASTOM type flat abrasion tester. The abrasion test was carried out by abrading the specimen 1,000 times with sand paper of a count of AA400, under a load of 456 g, at a rate of 125 cycles/minutes. After completion of the abrasion test, the abrasion resistance of the specimen was evaluated in accordance with the following standard.

| Class | Remarks |
|---|---|
| 5 | No change |
| 4 | A minor portion of surface layer is broken. |
| 3 | A major portion of surface layer is broken. |
| 2 | The inside layer is broken. |
| 1 | A hole is made. |

7. Density

Testing specimens, 10 cm long and 10 cm wide, were taken from the fabric to be tested. The volume in cm³ and weight in g of the specimens were measured. The density of the specimens was determined in accordance with the following equality.

$$\text{Density} = \frac{\text{Weight}}{\text{Volume}} \; (g/cm^3)$$

EXAMPLE 1

A cellulose solution was prepared by a cuprammonium method and extruded through 2000 spinnerets, each having 100 spinning orifices, into a coagulating water bath, so as to form 2000 groups each consisting of 100 filamentary solution streams. When the filamentary solution streams were incompletely coagulated in the water bath, each group of 100 filaments was bundled by means of a bundling guide and allowed to spontaneously adhere to each other without adhesive. Thereafter, the filaments bundles were completely coagulated in the water bath. The resultant filament bundles each had a denier of 20 and, further, were bundled all together so as to form a tow having a denier of 40,000. The individual filaments in the filament bundles each had a denier of 0.2. The tow was scoured and, then, dried. The dried tow was cut to provide cuprammonium staple fibers, each being composed of a fibrous bundle having a length of 10 mm. 500 g of the resultant staple fibers were charged little by little into a vessel containing 600 liters of water while agitating the water to form an aqueous suspension. The aqueous suspension was mixed with 2 liters of an aqueous solution containing 0.5% by weight of polyacrylamide and converted into a slurry having a viscosity of 200 cps. The slurry was subjected to a sheet-making process using a Hydroformer Model of an inclined long net type sheet-making machine. A raondom sheet consisting of the staple fibers and having a weight of 120 g/m² was obtained. Similar procedures to those mentioned above were carried out to produce a random sheet consisting of the staple fibers and having a weight of 70 g/m³.

A thin interlock knitted fabric consisting of a nylon 66 multifilament yarn of 40 denier/34 filaments and having a weight of 40 g/m² was uniformly open and interposed between the 70 g/m² random sheet and the 120 g/m² random sheet. The resultant precursor sheet, composed of three layers, was subjected to a bonding process in which numerous water jets ejected from ejecting orifices, each having an inner diameter of 0.1 mm, under a pressure of 40 kg/cm² were uniformly impacted onto the upper surface of the precursor sheet and, then, onto the lower surface of the precursor sheet. The above-mentioned impacting operations were repeated once for each surface of the precursor sheet. Thereafter, the upper and lower surfaces of the precursor sheet were further impacted with numerous water jets under a pressure of 60 kg/cm². By the above impacting operations, portions of the staple fibers, such composed of 100 fine filaments spontaneously adhering to each other in the random sheet constituents, were divided into thin fibrous bundles and into individual fine fibers. The resultant thin fibrous bundles and the individual fibers were entangled with each other and with the remaining staple fibers, so as to convert the random sheets into non-woven fabrics. Further, by the above-mentioned impacting operations, portions of the thin fibrous bundles, the individual fibers and the remaining staple fibers in the random sheet constituents were penetrated into the knitted fabric constituent and were entangled with a portion of the fibers in the knitted fabric constituent so as to firmly bond the knitted fabric constituents to the random sheet (non-woven fabric) constituents.

The composite fabric prepared above was subjected to a scanning electron microscopic observation. It was confirmed that the random sheets were converted into non-woven fabric constituents, and the non-woven fabric constituents were firmly bonded to the knitted fabric constituent so as to form a body of composite fabric having the cross-sectional structure as indicated in FIG. 3(A) of the drawings. Further, it was observed that the non-woven fabric constituents were composed of about 75% by weight of the sum of the staple fibers and thin fibrous bundles, and about 25% by weight of the individual fine fibers, and had an extremely high density of 0.36 g/cm³.

The composite fabric produced above was immersed in a solution of 15% by weight of polyurethane elastomer in dimethyl formamide, and squeezed with a mangle so that the composite fabric was impregnated with 300% of the polyurethane solution based on the weight of the composite fabric. The impregnated composite fabric was immersed in an aqueous solution containing 30% by weight of dimethyl formamide and kept in the solution for 30 minutes so as to completely coagulate the polyurethane in the composite fabric. Thereafter, the composite fabric was rinsed with water and dried.

The resultant composite fabric was subjected to a buffing process in which a surface of the composite fabric was buffed with sand paper. An artificial leather having a smoothly buffed surface and a nubuck-like configuration and feel were obtained. The buffed surface of the artificial leather was observed with a scanning electron microscope. It was confirmed that the piles formed on the buffed surface consisted of the staple fibers composed of the fine fibers adhering to each other without adhesive, thin fibrous bundles and the individual fine fibers, in the condition indicated in FIG. 3(A).

The buffed artificial leather had the following properties.

| | | |
|---|---|---|
| Weight | | 300 g/m² |
| Thickness | | 0.7 mm |
| Ratio in weight of composite fabric to polyurethane | | 77/23 |
| Tensile strength | Warp | 8.9 kg/cm |
| | Weft | 8.1 kg/cm |
| Tear strength | Warp | 3.5 kg |
| | Weft | 3.0 kg |
| Sewing strength | Warp | 6.5 kg/cm |
| | Weft | 5.8 kg/cm |
| Recovery in elongation | Warp | 92% |
| | Weft | 85% |
| Compressibility | | 27% |
| Recovery in compression | | 89% |

COMPARISON EXAMPLE 1

Procedures identical to Example 1 were carried out, except that no knitted fabric constituent was used. The resultant non-woven composite fabric had a relatively low density of 0.17 g/cm³. By using a scanning electron microscope, it was observed that although the non-woven composite fabric was composed of the staple fibers, thin fibrous bundles and individual fibers three-dimensionally entangled with each other, only a small number of the staple fibers, the thin fibrous bundles and the invidual fibers extended in the direction of the thickness of the fabric. Accordingly, the non-woven composite fabric had a low density and a paper-like hand. The composite fabric was impregnated with the polyurethane solution in the same manner as in Example 1. After the squeezing operation, the composite fabric could not completely recover to its initial thickness. Accordingly, the resultant comparative product sheet had a very small thickness. After the buffing operation, the comparative product sheet had the following properties.

| | | |
|---|---|---|
| Weight | | 225 g/m² |
| Thickness | | 0.5 mm |
| Ratio in weight of fabric to polyurethane | | 85/15 |
| Tensile strength | Warp | 4.4 kg/cm |
| | Weft | 3.7 kg/cm |
| Tear strength | Warp | 1.2 kg |
| | Weft | 1.1 kg |
| Sewing strength | Warp | 4.1 kg/cm |
| | Weft | 3.8 kg/cm |
| Recovery in elongation | Warp | 45% |
| | Weft | 41% |
| Compressibility | | 6% |
| Recovery in compression | | 65% |

In a comparison of the above properties of the comparative product sheet with those of Example 1, it is clear that the tensile strength, tear strength and sewing strength of the comparative product sheet are remarkably lower than those in Example 1. This fact shows that the entanglement of the staple fibers, the thin fibrous bundles and the individual fibers in the composite fabric are not completely sufficient. Further, from the fact that the comparative product sheet had a relatively small thickness of 0.5 mm and a poor compressibility of 6%, it is obvious that the comparative product sheet had a low density.

From the above-mentioned results, it is evident that the woven or knitted fabric constituent is indispensable for obtaining a composite fabric having superior physical properties and a high density.

EXAMPLE 2

Islands-in-sea type composite filaments were produced from 40% by weight of nylon 6 island constituent polymer having a relative viscosity ($\eta r$) in sulfaric acid of 3.2 and 60% by weight of polystyrene sea constituent polymer by a conventional melt-spinning process. The islands-in-sea type composite filaments were treated with chloroform at a temperature of 50° C. to remove the sea constituent polymer from the composite filaments. The resultant product was filament bundles each having a denier of 15 and each consisting of fine filaments each having a denier of 0.3. The filament bundles were treated with steam under a pressure of 3 kg/cm$^2$ so as to allow the individual filaments in each bundle to lightly adhere to each other without adhesive and to convert each filament bundle into a body of composite filament. The resultant composite filaments were crimped by means of a stuffing box and, then, cut to provide staple composite fibers having a length of 35 mm.

The nylon 6 staple fibers thus obtained were opened by means of an opener carding engine so as to form a plurality webs in which the staple fibers were located at random. The ramdom webs were subjected to a cross-laying operation in order to provide a random web having a weight of 100 g/m$^2$ and another ramdom web having a weight of 50 g/m$^2$. A gauze-like woven fabric composed of a polyester filament yarn of 30 denier/24 filaments and having a weight of 45 g/m$^2$, was interposed between the 100 g/m$^2$ random web and the 50 g/m$^2$ radom web to provide a three layer precursor sheet. The precursor sheet was subjected to a needle-punching process in which the precursor sheet was needle-punched at a needling number of 1500 times-/inch$^2$, and then, to a water-jets impacting process in which each surface of the needle-punched sheet was impacted once with numerous water jets under a pressure of 60 kg/cm$^2$. In the resultant composite fabric, the random webs were converted into non-woven fabric constituents firmly combined to the polyester filament fabric constituent and a portion of the staple composite fibers were divided into thin fibrous bundles, varying in the number of the individual fibers from which the fibrous bundles were formed, and into individual fibers. The composite fabric had a ratio in weight of the sum of the staple composite fibers and thin fibrous bundles to the individual fibers of 80:20, and a dencity of 0.34 g/cm$^3$.

The composite fabric was impregnated with polyurethane and buffed in the same manner as in Example 1. The artificial leather was a like suede and had very fine piles formed on the buffed surface thereof in a high density. The piles were composed of the staple composite fibers, the thin fibrous bundles and the individual fibers. The artificial leather had the following properties.

| Weight | | 325 g/m$^2$ |
|---|---|---|
| Thickness | | 0.8 mm |
| Ratio in weight of composite fabric to polyurethane | | 82/18 |
| Tensile strength | Warp | 9.2 kg/cm |
| | Weft | 8.7 kg/cm |
| Tear strength | Warp | 3.9 kg |
| | Weft | 3.7 kg |
| Sewing strength | Warp | 7.1 kg/cm |
| | Weft | 6.8 kg/cm |
| Recovery in elongation | Warp | 88% |
| | Weft | 84% |
| Compressibility | | 31% |
| Recovery on compression | | 90% |

COMPARISON EXAMPLE 2

Procedures identical to those in Example 2 were repeated, except that the islands-in-sea type composite fibers were used without removal of the sea constituent polymer from the composite fibers. The resultant composite fabric was composed of two non-woven fabric constituents each consisting of the composite fibers and a polyester filament woven fabric constituent interposed between and firmly bonded to the non-woven fabric constituents. The composite fabric was treated with boiling chloroform while refluxing, to remove the sea constituent polymer, that is, polystyrene, from the composite fibers. By the chloroform treatment, the composite fibers in the composite fabric were converted into conventional bundles of fine island constituent fibers. The thus converted composite fabric was very rough in densenes and had a small density of 0.14 g/cm$^2$.

The converted composite fabric was impregnated with a polyurethane and buffed in the same manner as in Example 2. The resultant artificial leather had a small thickness, a small bulkiness and a unsmooth surface having numerous piles in which a plurality of fine fibers were densely located to form bundles. The resultant artifical leather had the following properties.

| Weight | | 340 g/m$^2$ |
|---|---|---|
| Thickness | | 0.6 mm |
| Ratio in weight of composite fabric to polyurethane | | 82/18 |
| Tensite strength | Warp | 6.1 kg/cm |
| | Weft | 5.5 kg/cm |
| Tear strength | Warp | 2.2 kg |
| | Weft | 2.0 kg |
| Sewing strength | Warp | 3.2 kg/cm |
| | Weft | 2.9 kg/cm |
| Recovery on elongation | Warp | 62% |
| | Weft | 58% |
| Compressibility | | 11% |
| Recovery on compression | | 70% |

From the above properties, it is obvious that there were remarkable differences in the tensile, tear and sewing strengths and in compressibity between the artificial leather of Comparative Example 2, which consists of a woven fabric constituent and two non-woven fabric constituents composed of only fine fiber bundles, and the artificial leather of the present invention produced in Example 2, in which the staple fibers were divided into thin fibrous bundles varying in the number of the individual fibers forming the bundle and into individual fibers. That is, the dividing of the staple fibers into thin fibrous bundles and into the individual fibers in the present invention is very important for the obtaining of artificial leather having a high resistance to break and a high denseness. In other words, in order to produce an artificial leather having a excellent quality, it is indispensable that the non-woven fabric constituent be composed of staple fibers consisting of a plurality of fine fibers spontaneously adhering to each other, and thin fibrous bundles and individual fibers divided from a portion of the staple fibers, and has a high density.

COMPARISON EXAMPLE 3

The same random sheet as the 120 g/m² random sheet produced in Example 1 was produced. The random sheet was converted into a non-woven fabric by impacting numerous water jets onto the surface of the random sheet in the same manner as in Example 1. The same procedure as mentioned above was repeated using the same random sheet as the 70 g/cm² random sheet produced in Example 1, to produce another non-woven fabric.

The same knitted fabric having a weight of 40 g/m² as that used in Example 1 was interposed between the 120 g/m² non-woven fabric and the 70 g/m² non-woven fabric so as to form a three layer sheet. The three layer sheet was needle-punched at a needle density of 100 needles/inch². The three layers were lightly bonded to each other. It was observed that the three layers were bonded with a few of the fibrous bundles and individual fibers extending through two or three layers.

The bonded three layer sheet was impregnated with polyurethane in the same manner as in Example 1. The resultant artificial leather had a similar configuration to that obtained in Example 1 and the following properties.

| Weight | | 300 g/m² |
|---|---|---|
| Thickness | | 0.7 mm |
| Ratio by weight of three layer sheet to polyurethane | | 77/23 |
| Tensile strength | Warp | 4.7 kg/cm |
| | Weft | 4.0 kg/cm |
| Tear strength | Warp | 2.1 kg |
| | Weft | 1.9 kg |
| Sewing strength | Warp | 3.8 kg/cm |
| | Weft | 3.5 kg/cm |
| Recovery on elongation | Warp | 62% |
| | Weft | 71% |
| Compressibility | | 13% |
| Recovery on compression | | 65% |

The above properties show that the resistance to break, compressibility and recovery on compression of the artificial leather of Comparison Example 3 are remarkably lower than those of Example 1. That is, the product of Comparison Example 3 was useless as artificial leather. From the above fact, it is obvious that the excellent feature of the composite fabric of the present invention can not be obtained only from the three layer structure. That is, it is important that a portion of the staple fibers, each consisting of a fibrous bundle, is divided into thin fibrous bundles and into individual fibers, and that the remaining staple fibers, the thin fibrous bundles and the individual fibers are entangled with each other so as to form the non-woven fabric constituents, and; further that portions of the remaining staple fibers, the thin fibrous bundles and the individual fibers are entangled with a portion of the fibers from which the knitted fabric connstituent is formed so as to firmly combine the three layers.

EXAMPLE 3

The same procedures as in Example 1 were carried out for producing cuprammonium staple composite fibers, each having a denier of 20 and a length of 7 mm; each fiber consisting of 100 extremely fine fibers spontaneously adhering to each other without adhesive, and; each fiber having a denier of 0.2. 1000 g of the staple composite fibers were charged little by little into a vessel containing 1200 liters of water while agitating the water in order to prepare an aqueous suspension of the staple composite fibers. The aqueous suspension was mixed with 4 liters of an aqueous solution of 0.5% by weight of polyacrylamide. An aqueous slurry having a viscosity of 200 cps was obtained. The aqueous slurry was subjected to a sheet making process in which a random web having a weight of 80 g/m² and another random web having a weight of 60 g/m² were simultaneously produced by using a Hydroformer Model of an inclined long net type paper-making machine. A large stitch interlock knitted fabric having a weight of 60 /m² and composed of a nylon 66 filament yarn was inserted between the above-mentioned random webs. A three layer precursor sheet was obtained. The sheet was subjected to a water jet impacting process in which the upper and lower surfaces of the precursor sheet were each impacted once with numerous water jets ejected through ejecting orifices, having an inner diameter of 0.1 mm, under a pressure of 20 kg/cm². The distance between the ejecting end of the orifice and the surface of the precursor sheet to be impacted was 2 cm. During the impacting operation, the precursor sheet was placed on a metal net and a suction was applied to the precursor sheet through the net under a reduced pressure of −35 mmHg. Thereafter, an additional impacting process was applied two times each onto the upper and lower surfaces of the above-mentioned impacted sheet, in a similar manner to that described above, under a pressure of 30 kg/cm². A further impacting process was applied once onto each of the upper and lower surfaces of the additionally impacted sheet, in the similar manner to that described above, under a pressure of 40 kg/cm². By observation of the cross-sectional profile of the resultant composite fabric with a scanning electron microscope, it was confirmed that the three layers were firmly bonded to form a body of the composite fabric; that a portion of the staple composite fibers in the non-woven fabric constituents was divided into thin fiber bundles varying in number of individual fibers and into individual fibers, and; that the thin fibrous bundles, the individual fibers and the remaining staple fibers were randomly entangled with each other.

The composite fabric thus prepared was immersed in an aqueous solution containing 5% by weight of polyvinyl alcohol and squeezed by way of suction so that the composite fabric was impregnated with 120% of the polyvinyl alcohol solution based on the weight of the fabric. The squeezed fabric was dried by blowing hot air thereon at a temperature of 100° C. The dried fabric was immersed in an aqueous solution containing 10% by weight of polyurethane in dimethylformamide and squeezed by means of a mangle so as to impregnate the fabric with 250% of the solution based on the weight of the fabric. The impregnated fabric was immersed in a mixture of 30% by weight of dimethylformamide and 70% by weight of water for 30 minutes to incompletely coagulate the polyurethane and, then, immersed in water to completely coagulate the polyurethane. The composite fabric treated as described above was immersed in boiling water to eliminate the polyvinyl alcohol from the composite fabric and dried. The dried composite fabric was buffed with same paper to convert it to an artificial leather.

The artificial leather was dyed in the following conditions.

| Dying bath | |
|---|---|
| Component | Amount (% based on the weight of fabric) |
| Kayarus Supra Red 6BL (C.I. No. 29065) | 3 |
| Karalon Polyester Black BF (C.I. No.) | 3% |
| Common salt | 5% |
| Disper TL* | 5% |
| Liquor Ratio | 1/50 |
| Time | 1 hour |

Note: *Trademark of a dispersing agent made by Meisei Chemical Co., Ltd., Japan.

The color of the dyed artificial leather was extremely brilliant. The dyed artificial leather was very soft and had a nubuck-like configuration and a significant chalk marking effect. Accordingly, the dyed artificial leather was useful as a material for women's suits and one piece dresses.

The dyed artificial leather had the following properties.

| | | |
|---|---|---|
| Weight | | 250 g/m² |
| Thickness | | 0.6 mm |
| Ratio by weight of fabric to polyurethane | | 200/50 |
| Ratio by weight of fibrous bundle to individual fiber | | 40/60 |
| Tensile strength | Warp | 9.5 kg/cm |
| | Weft | 9.0 kg/cm |
| Elongation at break | Warp | 75% |
| | Weft | 60% |
| Tear strength | Warp | 4.9 kg |
| | Weft | 4.5 kg |
| Sewing strength | Warp | 6.5 kg |
| Recovery on elongation | Warp | 95% |
| | Weft | 87% |
| Compressibility | | 30% |
| Recovery on compression | | 92% |
| Density | | |
|   Artificial leather | | 0.42 g/cm³ |
|   Composite fabric | | 0.34 g/cm³ |
| Rubbing resistance | | class 4 |

A suit was made from the artificial leather of the present example and worn everyday for 1 month. Buttons of the suit were buttoned and unbuttoned twenty times or more a day, and something was put into and taken out of the pockets of the suit at least fifth times a day. However, no change was observed in the button holes and pockets.

Also, pieces of the dyed artificial leather were sewed on knee portions of sport trousers. The sport trousers were worn for 1 month for sport training. The knee portions of the trousers were frequently rubbed on the floor surface of gymnasium while the during sport was played. After being worn for 1 month, it was found that the pieces of the artificial leather were slightly abraded, but the knitted fabric constituent of the artificial leather was still covered by the non-woven fabric constituent.

EXAMPLE 4

The same operations as in Example 3 were repeated to produce the cuprammonium staple composite fibers, except that the fibers had a length of 5 mm. 900 g of the composite staple fibers were mixed with 100 g of polyvinyl alcohol staple fibers having a length of 3 mm and a denier of 3.0. The mixture was suspended little by little in 1200 liters of water contained in a vessel while lightly stirring the water. The resultant suspension was mixed with 4 liters of an aqueous solution of 0.5% by weight of polyacrylamide. An aqueous slurry having a viscosity of 200 cps was obtained. The slurry was subjected to a three layer sheet-making process. In this process, a random web having a weight of 100 g/m² and another random web having a weight of 60 g/m² were produced from the slurry by using a Hydroformer Model of an inclined long net type paper-making machine. A large stitch knitted fabric composed of a nylon 66 filament yarn and having a weight of 40 g/m² was inserted between the above-mentioned random webs.

The resultant three layer precursor sheet was subjected to a water jet impacting process. In this process, numerous water jets which had been ejected through ejecting orifices, having an inside diameter of 0.1 mm, under a pressure of 30 kg/cm², were impacted once onto the upper and, then, the lower surface of the precursor sheet. The ejecting end of the orifices were 3 cm away from the surface of the precursor sheet to be impacted. In this impacting process, the precursor sheet was placed on a metal net and a suction was applied to the precursor sheet through the metal net under a reduced pressure of −35 mmHg, so as to promote the passing of water streams through the precursor sheet. An additional impacting process was applied three times each onto the upper and lower surfaces of the above described impacted sheet under a pressure of 30 kg/cm².

A composite fabric consisting of two non-fabric constituents, and a knitted fabric constituent inserted therebetween and firmly bonded to the non-woven fabric constituents, was obtained. In the non-woven fabric constituents, a portion of the composite staple fibers was divided into thin fibrous bundles and into individual fibers, and the remaining composite staple fibers, the thin fibrous bundles and the individual fibers were randomly entangled with each other.

The composite fabric was compressed with a pair of nip rollers which had been heated to a temperature of 120° C. so as to dissolve the polyvinyl alcohol fibers in the random webs. Then, the composite fabric cooled, to preliminarily restrict the composite staple fibers in the random webs from relative movement to each other, with the polyvinyl alcohol. The composite fabric thus treated was immersed in a 10% polyurethane solution in dimethylformamide and squeezed with a mangle so as to impregnate the composite fabric with 230% of the solution based on the weight of the composite fabric. Thereafter, the impregnated composite fabric was immersed in a mixture solution of 30% by weight of dimethyl formamide and 70% by weight of water for 30 minutes, to incompletely coagulate the polyurethane, and then, immersed in water for the completion of the coagulation. The composite fabric was immersed in boiling water, for the removal of the polyvinyl alcohol from the composite fabric, and dried. The dried composite fabric was buffed with sand paper. A nubuck-like artificial leather having fine piles formed on a surface thereof was obtained. This artificial leather was very soft like that produced in Example 3 and had the following properties.

| | | |
|---|---|---|
| Weight | | 245 g/m² |
| Thickness | | 0.6 mm |
| Ratio by weight of composite fabric to polyurethane | | 200/45 |
| Ratio by weight of fibrous bundles to individual fibers | | 20/80 |
| Tensile strength | Warp | 8.0 kg/cm |
| | Weft | 7.2 kg/cm |
| Tear strength | Warp | 3.5 kg |
| | Weft | 3.0 kg |
| Sewing strength | Warp | 6.0 kg/cm |
| | Weft | 5.3 kg/cm |

| -continued | | |
|---|---|---|
| Recovery on elongation | Warp | 95% |
| | Weft | 85% |
| Compressibility | | 32% |
| Density | | |
| artificial leather | | 0.41 g/cm³ |
| Composite fabric | | 0.33 g/cm³ |
| Resistance to rubbing | | class 4 |

A portion of the artificial leather was used for a wearing test in the same manner as described in Example 3. The results were very good.

EXAMPLE 5

The same procedures as in Example 4 were carried out, except that a 15% polyurethane solution was used and the ratio by weight of the composite fabric to the polyurethane in the resultant artificial leather was 200/70. The artificial leather had a little greater stiffness than that of Example 4 and had a high denseness. This artificial leather was useful as a material for overcoats and blazer coats.

COMPARISON EXAMPLE 4.

The same procedures as in Example 4 were carried out to provide the same composite staple fibers of 5 mm long as in Example 4. The composite staple fibers were converted into a random web having a weight of 200 g/m² by the same paper-making process as in Example 4. The random web was impacted by numerous water jets ejected through orifices, each having an inside diameter of 0.1 mm, under a pressure of 20 kg/cm². Due to the absence of the knitted or woven fabric constituent to be bonded to the random sheet and the small length of the composite staple fibers in the random web, a portion of the composite staple fibers which had been impacted with the water jets was scattered by the water jets, and therefore, no conversion of the random web into a non-woven fabric occurred. Accordingly, it was impossible to provide an artificial leather from the random web.

The same operations as in Example 4 were repeated to produce a random web having a weight of 500 g/cm² by way of a paper-making process. The random web was subjected to a needle-punching process to convert the web to a non-woven fabric. However, the needle-punching failed to entangle the composite staple fibers with each other due to the length of the composite staple fibers being too small. Consequently, a non-woven fabric could not be obtained.

EXAMPLE 6

The same composite staple fibers as in Example 3 were used to provide a random web having a weight of 100 g/m² by the same paper-making process as in Example 3. A knitted fabric composed of a nylon 66 filament yarn and having a weight of 40 g/m² was superimposed on the random web. The resultant two layer sheet was converted into an artificial leather by the same process as in Example 3. The resultant artificial leather was useful as a material for clothing, however, its surface condition and feel were somewhat inferior than that of the product in Example 3. The artificial leather was provided with the following properties.

| | |
|---|---|
| Weight | 185 g/m² |
| Thickness | 0.5 mm |
| Ratio by weight of composite fabric to polyurethane | 140/45 |

| -continued | | |
|---|---|---|
| Ratio by weight of fibrous bundles to individual fibers | | 70/30 |
| Tensile strength | Warp | 7.0 kg/cm |
| | Weft | 6.8 kg/cm |
| Tear strength | Warp | 2.9 kg |
| | Weft | 2.8 kg |
| Sewing strength | Warp | 6.0 kg/cm |
| | Weft | 5.5 kg/cm |
| Recovery on elongation | | 89% |
| Density | | |
| Artificial leather | | 0.37 g/cm³ |
| Composite fabric | | 0.29 g/cm³ |
| Resistance to rubbing | | class 4 |

EXAMPLE 7

Composite filaments having a cross-sectional profile as indicated in FIG. 7B were produced from nylon 6 and polyethylene terephthalate. The composite filaments had a denier of 1.7 and could be divided into one individual fine filament having a denier of 0.5 and consisting of polyethylene terephthalate, and four individual fine filaments having a denier of 0.3 and consisting of nylon 6. The composite filaments were cut to form composite staple fibers having a length of 5 mm. The composite staple fibers were subjected to a random web-making process in which two random webs each having a weight of 60 g/m² were concurrently produced from the composite stable fibers by the same paper-making process as in Example 3. A knitted fabric having a weight of 40 g/m² and consisting of yarns of 50 deniers/24 filaments was interposed between the two random webs. The resultant three layer precursor sheet was subjected to a composite fabric-forming process in which the three layer sheet was impacted with numerous water jets ejected through 0.1 mm orifices under a pressure of 20 kg/cm². The impacting operation was applied once to each of the upper and lower surfaces of the three layer sheet. Thereafter, an impacting operation similar to that described above was carried out twice on each of the upper and lower surfaces of the three layer sheet under a pressure of 40 kg/cm², and thereafter, once more under a pressure of 60 kg/cm². By scanning electron microscopic observation, it was confirmed that the knitted fabric constituents were firmly bonded to the non-woven fabric constituents, to form a body of composite fabric.

The composite fabric was immersed in an aqueous solution of 5% by weight of polyvinyl alcohol, squeezed with a mangle so as to impregnate the fabric with 7% by weight of polyvinyl alcohol, and then, dried with hot air at a temperature of 100° C. The composite fabric thus treated was immersed in 10% polyurethane solution in dimethyl formamide, squeezed with a mangle so as to impregnate the composite fabric with 250% of the polyurethane solution based on the weight of the fabric, immersed in a mixture of 30 parts by weight of dimethyl formamide and 70 parts by weight of water to incompletely coagulate the polyurethane, and then, immersed in water to completely coagulate the polyurethane. The thus coagulated composite fabric was immersed in boiling water, to eliminate the polyvinyl alcohol therefrom, and dried. The dried composite fabric was buffed with sand paper. A nubuck-like artificial leather having a smoothly raised surface was obtained. The artificial leather was very soft and had the following properties.

| | |
|---|---|
| Weight | 200 g/m² |

| | | |
|---|---|---|
| Thickness | | 0.5 mm |
| Ratio by weight of composite fabric to polyurethane | | 160/40 |
| Ratio by weight of fibrous bundles to individual fibers | | 10/90 |
| Tensile strength | Warp | 8.3 kg/cm |
| | Weft | 8.0 kg/cm |
| Tear strength | Warp | 3.4 kg |
| | Weft | 3.0 kg |
| Sewing strength | Warp | 6.5 kg/cm |
| | Weft | 6.0 kg/cm |
| Recovery on elongation | Warp | 92% |
| | Weft | 87% |
| Density | | |
|   Artificial leather | | 0.40 g/cm$^3$ |
|   Composite fabric | | 0.32 g/cm$^3$ |
| Resistance to rubbing | | class 5 |

EXAMPLE 8

Islands-in-sea type composite filaments were prepared from 40 parts by weight of nylon 6 as island constituents and 60 parts by weight of polystyrene as sea constituent by way of melt-spinning. The sea constituent polymer was eliminated from the composite filaments with chloroform at a temperature of 50° C. Filament bundles, each having a denier of 20 and each consisting of 0.2 denier nylon 6 fine filaments, were obtained. The filament bundles were heated with steam at a temperature of 140° C. for a short time, so as to spontaneously and lightly adhere the fine filaments to each other, and then, cut to provide composite staple fibers each consisting of 10 fine fibers adhering to each other and having a length of 10 mm. The composite staple fibers were subjected to a random web-forming process in which two random webs, each having a weight of 100 g/m$^2$, were concurrently produced by the same paper-making machine as used in Example 3. A woven fabric made of polyester filament yarns and having a weight of 45 g/cm$^2$ was inserted between the above random webs to provide a three layer precursor sheet.

The precursor sheet was subjected to a water jet impacting process in which numerous water jets were ejected under a pressure of 60 kg/cm$^2$ through orifices having an inside diameter of 0.1 mm and located on an orifice head, while shaking the orifice head in the lateral direction of the sheet. The impacting operation was applied three times onto each of the upper and lower surfaces of the precursor sheet. A composite fabric was obtained in which the woven fabric constituent was firmly bonded to the non-woven fabric constituents converted from the random webs. It was observed that during the impacting operation, a portion of the composite staple fibers was divided into thin fibrous bundles and into individual fibers, and the thin fibrous bundles, the individual fibers, the remaining composite staple fibers and the fibers in the woven fabric constituent were entangled with each other. From this composite fabric, an artificial leather was prepared in the same manner as mentioned in Example 3. The raised surface of the resultant artificial leather was uniformly and smoothly covered by fine piles, and had a nubuck-like configuration and feel.

The artificial leather had the following properties.

| | | |
|---|---|---|
| Weight | | 320 g/m$^2$ |
| Thickness | | 0.8 mm |
| Ratio by weight of composite fabric to polyurethane | | 245/75 |
| Ratio by weight of fibrous bundles to individual fibers | | 80/20 |
| Tensile strength | Warp | 9.1 kg/cm |
| | Weft | 8.5 kg/cm |
| Tear strength | Warp | 3.9 kg |
| | Weft | 3.5 kg |
| Sewing strength | Warp | 7.0 kg/cm |
| | West | 6.5 kg/cm |
| Recovery on elongation | Warp | 88% |
| | Weft | 85% |
| Compressibility | | 30% |
| Recovery on compression | | 90% |
| Density | | |
|   Artificial leather | | 0.40 g/cm$^3$ |
|   Composite fabric | | 0.31 g/cm$^3$ |
| Resistance to rubbing | | class 5 |

COMPARISON EXAMPLE 5

The same procedures as in Example 8 were repeated for producing the three layer precursor sheet, except that the sea constituent polymer was not eliminated from the islands-in-sea type composite filaments and the composite staple fibers had a length of 10 mm. The three layer precursor sheet was subjected to the same impacting process as that described in Example 8 to form a composite fabric. After impregnating the composite fabric with the polyvinylalcohol in the same manner as described in Example 8, the sea constituent polymer was dissolved away with trichloroethylene. After the sea constituent polymer was removed, it was observed that only a portion of the composite staple fibers in the non-woven fabric constituents, was entangled with the fibers of the woven fabric constituent. The composite fabric had a very small density of 0.18 g/cm$^3$. When the composite fabric was converted into an artificial leather by the same process as used in Example 8, the raised surface of the artificial leather was covered with a small number of piles and had an undesirably unsmooth configuration.

EXAMPLE 9

Procedures identical to those in Example 1 were repeated to produce composite staple fibers having a length of 0.5 mm and a denier of 20, and consisting of 100 extremely fine fibers each having a denier of 0.2 and adhering to each other without adhesive. 1000 g of the composite staple fibers were suspended little by little in 1200l of water contained in a vessel. 4 liters of an aqueous solution of 0.5% by weight of polyacrylamide were added to the aqueous suspension to provide an aqueous slurry with a viscosity of 200 cps. Two random webs of 75 g/m$^2$ were concurrently produced from the aqueous slurry in the same manner as described in Example 1, and a thin knitted tricot fabric having a weight of 50 g/m$^2$ and composed of nylon 66 yarns of 40 denier/13 filaments was inserted between the two random webs to form a three layer precursor sheet. The precursor sheet had a width of 1 m. An 80 mesh metal net was placed on the precursor sheet. Numerous water jets were ejected onto the precursor sheet through the metal net under the following conditions, so as to impact each of the upper and lower surfaces of the precursor sheet once.

| | |
|---|---|
| Inside diameter of ejecting orifice | 0.1 mm |
| Number of orifices | 700 |
| Frequency of shaking motion of orifice head | 400 times/minute |
| Ejecting pressure of water jets | 20 kg/cm$^2$ |
| Reduced pressure for suction | 30 mmHg |
| Forwarding speed of precursor sheet | 2 m/min |
| Distance between ejecting end of orifice and precursor sheet | 2 cm |

A portion of the above described impacted sheet was cut off and dried. In observation of the cross-sectional profile and outer surfaces of the sheet, it was found that almost all of the composite staple fibers in the random web constituents in the sheet were divided into thin fibrous bundles and into individual fibers. Also, it was observed that the outer surface portions of the sheet were composed mainly of the individual fibers and that the knitted fabric constituent could be easily peeled off from the random web constituents.

The above described impacted sheet was additionally subjected to the same impacting process as mentioned above, except that the ejecting pressure of the water jets was 30 kg/cm². The impacting process was applied once onto each of the upper and lower surfaces of the sheet. After the completion of the impacting process, it was observed, by means of a scanning electron microscope, that the random webs in the sheet were converted into non-woven fabrics in which the thin fibrous bundles and individual fibers were randomly entangled. It was also observed that the knitted fabric constituent was firmly bonded to the non-woven fabric constituents by the entanglement of portions of the fibrous bundles and individual fibers in the non-woven fabric constituents with a portion of the fibers in the knitted fabric constituent.

The resultant composite fabric was immersed in an aqueous solution of 5% by weight of polyvinyl alcohol, squeezed by way of suction so as to impregnate the composite fabric with 150% of the solution based on the weight of the fabric and, then, dried with hot air at a temperature of 100° C.

The dried composite fabric was immersed in a solution of 10% by weight of polyurethane and 7% of the C.I. Pigment Red 50, based on the weight of the polyurethane, in dimethyl formaldehyde; squeezed with a mangle so as to impregnate the fabric with 250% of the solution based on the weight of the fabric; immersed in a mixture of dimethylformamide and water in a proportion by weight of 30:70 for 30 minutes, to incompletely coagulate the polyurethane, and; then, immersed in water to the completion of the coagulation.

The above-impregnated composite fabric was immersed in boiling water to dissolve away the polyvinyl-alcohol from the fabric and, then, dried. The thus dried composite fabric was buffed with sand paper and, thereafter, dyed under the following conditions.

| Dyeing Bath | Content | Amount (based on the weight of fabric) |
|---|---|---|
| Dye | Kayarus Supra Red 6 BL | 3% |
| Auxiliary | Common salt | 5% |
| | Disper TL | 5% |
| Liquor ratio | | 1/20 |
| Dyeing time | | 1 hour |

The color of the dyed composite fabric was very brilliant. The dyed fabric was additionally buffed. The resultant artificial leather was very soft and had a nubuck-like configuration, feel and chalk marking effect, and was useful as a material for women's suits and one piece dresses.

The artificial leather had the following properties.

| | |
|---|---|
| Weight | 255 g/m² |
| Thickness | 0.6 mm |
| Proportion by weight of composite fabric to polyurethane | 200/50 |

| | | |
|---|---|---|
| Proportion by weight of fibrous bundles to individual fibers | | 5/95 |
| Tensile strength | Warp | 9.6 kg/cm |
| | Weft | 9.2 kg/cm |
| Elongation at break | Warp | 85% |
| | Weft | 95% |
| Tear strength | Warp | 4.5 kg |
| | Weft | 4.3 kg |
| Sewing strength | Warp | 6.5 kg/cm |
| | Weft | 6.2 kg/cm |
| Recovery on elongation | Warp | 97% |
| | Weft | 96% |
| Compressibility | | 26% |
| Recovery on compression | | 94% |
| Density | | |
| Artificial leather | | 0.43 g/cm³ |
| Composite fabric | | 0.35 g/cm³ |
| Resistance to abrasion | | class 4 |

The artificial leather was subjected to the same wearing test as described in Example 3. The results were similar to those in Example 3.

EXAMPLE 10

Polyacrylonitrile filaments were prepared by extruding a solution of polyacrylonitrile in a concentrated nitric acid through spinnerets to form numerous filamentory solution streams and coagulating the filamentary solution streams in a diluted aqueous solution of nitric acid. The coagulated filaments were washed with water to completely remove the nitric acid solution and drawn art a draw ratio of 10 while heating the filaments with steam. The drawn filaments were dried and wound on a bobbin. During the coagulating operation, the coagulated filaments were bundled with a bundling guide so as to allow the coagulated filaments to spontaneously adhere to each other without adhesive. The resultant filament bundles had a denier of 20 and were each composed of 100 polyacrylonitrile filaments. The filaments bundles were cut to provide composite staple fibers having a length of 5 mm. 100 g of the composite staple fibers were charged little by little into 1200 liters of water contained in a vessel and suspended in the water while agitating the water. 4 liters of an aqueous solution of 0.5% by weight of polyacrylamide were mixed in the aqueous suspension to provide an aqueous slurry with a viscosity of 200 cps. A random web having a weight of 100 g/m² and another random web having a weight of 50 g/m² were concurrently produced from the aqueous slurry by the same method as described in Example 3. A knitted tricot fabric having a weight of 50 g/m³ was inserted between the above-prepared random webs to provide a three layer precursor sheet.

The three layer precursor sheet was subjected to the same water jet impacting process as described in Example 3 under the following conditions.

| | |
|---|---|
| Inside diameter of ejecting orifices | 0.1 mm |
| Number of orifices | 700 |
| Frequency of shaking motions or orifice head | 600 times/minute |
| Ejecting pressure of water jets | 30 kg/cm² |
| Reduced pressure for suction | −30 mmHg |
| Forwarding speed of sheet | 2 m/minute |
| Distance of ejecting end of orifice to metal net | 3 cm |

The impacting process was applied to each of the upper and lower surfaces of the precursor sheet once. During the impacting process, a 120 mesh metal net was located at a distance of 3 mm from the surface of the sheet to be impacted, and the water jets were impacted onto the sheet surface through the metal net.

A portion of the impacted sheet was cut off and dried. The cut piece of the sheet was observed at the cross-sectional profile and the surfaces thereof. It was found that, whereas almost all of the composite staple fibers in the random webs were divided into fibrous bundles and into individual fibers so as to uniformly cover the knitted fabric constituent with the masses of the thin fibrous bundles and the individual fibers, the knitted fabric constituent could be easily peeled off from the random sheets. That is the random web constituents were very lightly bonded to the knitted fabric constituent. The above-treated sheet was additionally impacted with numerous wet jets using the same methods as mentioned above. The impacting process was applied to each of the upper and lower surfaces of the precursor sheet once at a pressure of 40 kg/cm$^2$, and once to each at a pressure of 20 kg/cm$^2$. By the additional impacting processes, the random webs were converted into a non-woven fabric and firmly bonded to the knitted fabrics constituents.

The resultant composite fabric was immersed in an aqueous solution of 5% by weight of polyvinyl alcohol, squeezed by way of suction so as to impregnate the composite fabric with 100% of the solution based on the weight of the fabric and, then, dried by blowing hot air thereon at a temperature of 100° C. The dried composite fabric was immersed in an aqueous dispersion of 20% by weight of a polyurethane, squeezed with a mangle so as to impregnate the composite fabric with 150% on the dispersion based on the weight of the fabric and, then, dried in a hot air drier at a temperature of 140° C. The dried composite fabric was immersed in boiling water, to remove the polyvinyl alcohol from the composite fabric, and dried. The dried fabric was buffed with sand paper. The resultant raised artificial leather had a nubuck-like configuration and feel, and the following properties.

| | | |
|---|---|---|
| Weight | | 250 g/m$^2$ |
| Thickness | | 0.65 mm |
| Proportion by weight of composite fabric to polyurethane | | 200/50 |
| Proportion by weight of fibrous bundles to individual fibers | | 10/90 |
| Tensile strength | Warp | 10.5 kg/cm |
| | Weft | 9.8 kg/cm |
| Tensile elongation | Warp | 80% |
| | Weft | 110% |
| Tear strength | Warp | 5.2 kg |
| | Weft | 4.7 kg |
| Sewing strength | Warp | 6.6 kg/cm |
| | Weft | 6.4 kg/cm |
| Recovery on elongation | Warp | 96% |
| | Weft | 93% |
| Compressibility | | 22% |
| Recovery on compression | | 95% |
| Density | | |
|   Artificial leather | | 0.41 g/cm$^3$ |
|   Composite fabric | | 0.32 g/cm$^3$ |
| Resistance to abrasion | | class 5 |

The artificial leather was subjected to the same wearing test as described in Example 3. The results were very good.

COMPARISON EXAMPLE 6

The same procedures as in Example 10 were repeated to produce composite polyacrylonitrile staple fibers 5 mm long. A random web having a weight of 200 g/m$^2$ was produced from the above composite staple fibers and converted into a non-woven fabric by the same process as in Example 10, except that no knitted fabric constituent was used. By the water jet impacting process using a metal net, almost all of the composite staple fibers located in the surface portions of the fabric were divided into a minor part of thin fibrous bundles and into a major part of individual fibers. However, only a minor portion of the composite staple fibers located in the inside of the fabric were divided. After the above impacting operation, the same impacting operation as described above was repeated without using the metal net. Almost all of the composite staple fibers impacted with the water jets were removed due to the length of the composite staple fibers being too small and the absence of the knitted fabric constituent. Accordingly, it was impossible to convert the random web into non-woven fabric having a high resistance to break.

Another random web having a weight of 500 g/m$^2$ was prepared from the composite polyacrylonitrile staple fibers and needle punched. However, due to the small length of the fibers, it was impossible to randomly entangle the fibers with each other so as to convert the random web into a non-woven fabric.

EXAMPLE 11

The same composite cuprammonium staple fibers as in Example 9 were converted into a random web having a weight of 80 g/m$^2$ by the same process as in Example 9. A two layer precursor sheet was prepared by superimposing the random web on the same knitted tricot fabric as used in Example 9. The upper surface of the random web constituent of the precursor sheet was covered with an 80 mesh metal net and impacted with numerous water jets through the metal net under the following conditions.

| | |
|---|---|
| Inside diameter of orifice | 0.1 mm |
| Number of orifices | 700 |
| Frequency of shaking motion of orifice head | 400 times/minute |
| Ejecting pressure of water jets | 20 kg/cm$^2$ |
| Reduced suction pressure | -20 mmHg |
| Forwarding speed of sheet | 1 m/minute |
| Distance between ejecting end of orifice and metal net | 4 cm |
| Distance between ejecting end of orifice and sheet | 5 cm |

A portion of the impacted sheet was cut off and dried to observe the surface and the cross-sectional profile of the above-impacted sheet. It was observed that almost all of the composite staple fibers were divided into a minor amount of thin fibrous bundles and into a major amount of individual fibers; that the knitted fabric constituent was substantially completely covered with the divided thin fibrous bundles and individual fibers in the non-woven fabric constituent, and could be easily peeled off from the non-woven fabric consituent. The above-impacted sheet was additionally impacted with numerous water jets under a pressure of 35 kg/cm$^2$ using the same method as described above. As a result of the additional impacting process, the non-woven fabric constituent was firmly bonded to the knitted fabric constituent, and a body of composite fabric was obtained.

In a scanning electron microscopic observation, it was confirmed that portions of the thin fibrous bundles and the individual fibers penetrated into the inside of the knitted fabric constituent (but not broke through the knitted fabric constituent), and firmly entangled with a portion of the fibers in the knitted fabric constituent.

The composite fabric thus prepared was converted into a suede-like artificial leather using the same method as described in Example 9. The artificial leather had a nubuck-like raised surface and a knitted fabric surface.

The artificial leather had the following properties.

| | | |
|---|---|---|
| Weight | | 170 g/m² |
| Thickness | | 0.51 mm |
| Proportion by weight of composite fabric to polyurethane | | 130/40 |
| Proportion by weight of fibrous bundles and individual fibers | | 5/95 |
| Tensile strength | Warp | 7.0 kg/cm |
| | Weft | 6.8 kg/cm |
| Elongation at break | Warp | 75% |
| | Weft | 96% |
| Tear strength | Warp | 3.0 kg |
| | Weft | 2.6 kg |
| Sewing strength | Warp | 5.4 kg/cm |
| | Weft | 4.8 kg/cm |
| Compressibility | | 26% |
| Recovery on compression | | 94% |
| Dencity Artificial leather | | 0.38 g/cm³ |
| Composite fabric | | 0.30 g/cm³ |
| Resistance to abrasion | | class 4 |

EXAMPLE 12

Composite polyacrylonitrile staple fibers consisting of 100 five filaments, each of 0.2 denier, adhering to each other without adhesive, and having a denier of 20 and a length of 7 mm, were prepared by the same method as in Example 10. The composite staple fibers were converted into a random web having a weight of 100 g/m² and another random web of a weight of 50 g/m². The random webs were used to provide a three layer precursor sheet by the same process as in Example 10. The precursor sheet was needle-punched by using numerous needles having no barb, at a needle number of 3000 needles/inch², to divide the composite staple fibers in the sheet into thin fibrous bundles and into individual fibers.

A portion of the above described needle-punched sheet was cut off and observed by means of a scanning electron microscope. It was confirmed that a considerable portion of the composite staple fibers were divided, but the number of divided composite staple fibers was smaller than that divided by the water-jet impacting process in Example 10.

The above-needle punched sheet was impacted with numerous water jets, ejected through numerous orifices, shaking over the whole surface of the sheet under the following conditions.

| | |
|---|---|
| Diameter of ejecting orifice | 0.1 mm |
| Number of orifices | 700 |
| Frequency of shaking motion of orifice head | 600 times/minute |

The ejecting pressure of water jets was varied in such a manner that the precursor sheet was, firstly, impacted with 200 water jets under a pressure of 10 kg/cm², secondly, with 300 water jets under a pressure of 20 kg/cm² and, finally, with 100 water jets under a pressure of 30 kg/cm².

After the completion of the above described water jet impacting process, the random webs were converted into non-woven fabrics and firmly bonded to the knitted fabric constituent to an extent that the non-woven fabric constituents could not be stripped off from the knitted fabric constituent without breakage thereof. In a scanning electron microscopic observation of the cross-sectional profile of the resultant composite fabric, it was confirmed that a major portion of the composite staple fibers were divided into thin fibrous bundles and into individual fine fibers. It was also observed that the divided thin bundles and fibers were randomly entangled with each other, and with the remaining composite staple fibers, and that portions of the bundles and individual fibers were entangled with a portion of the fibers in the knitted fabric constituent so as to form a body of composite fabric.

The composite fabric was immersed in an aqueous solution of 5% by weight of polyvinyl alcohol, squeezed by way of suction so as to impregnate the fabric with 150% of the solution based on the weight of the fabric and dried with hot air at a temperature of 100° C. The dried composite fabric was immersed in an aqueous dispersion of 20% by weight of polyurethane, squeezed with a mangle so as to inpregnate the fabric with 125% of the solution based on the weight of the fabric and dried in a hot air dryer at a temperature of 140° C. The above described dried fabric was immersed in boiling water to remove the polyvinyl alcohol from the fabric and, then, dried. By buffing with sand paper, the polyurethane-impregnated composite fabric was converted into a nubuck-like artificial leather provided with a very smooth raised surface and having the following properties.

| | | |
|---|---|---|
| Weight | | 250 g/m² |
| Thickness | | 0.7 mm |
| Proportion by weight of composite fabric to polyurethane | | 200/50 |
| Proportion by weight of fibrous bundle to individual fibers | | 10/90 |
| Tensile strength | Warp | 8.5 kg/cm |
| | Weft | 8.0 kg/cm |
| Elongation at break | Warp | 80% |
| | Weft | 98% |
| Tear strength | Warp | 5.4 kg |
| | Weft | 4.9 kg |
| Sewing strength | Warp | 6.5 kg/cm |
| | Weft | 6.4 kg/cm |
| Recovery on elongation | Warp | 92% |
| | Weft | 90% |
| Compressibility | | 26% |
| Recovery on compression | | 94% |
| Density Artificial leather | | 0.42 g/cm³ |
| Composite fabric | | 0.35 g/cm³ |
| Resistance to abrasion | | class 5 |

EXAMPLE 13

The same procedures as in Example 7 were repeated to provide a three layer precursor sheet consisting of a random web having a weight of 60 g/m², a knitted fabric having a 40 g/m² and a random web having a weight of 60 g/m². The precursor sheet was covered with a 120 mesh metal net and subjected to a water jet impacting process under the following conditions.

| | |
|---|---|
| Inner diameter of orifice | 0.1 mm |
| Number of orifices | 500 |
| Frequency of shaking motion of orifice head | 400 times/minute |
| Ejecting pressure | 20 kg/cm² |
| Reduced suction pressure | −30 mmHg |
| Forwarding speed of sheet | 15 m/minute |

A portion of the sheet thus impacted was cut off and dried. By microscopic observation of the surface and cross-sectional profile of the dried sheet, it was found that a major portion of the composite staple fibers in the random webs was divided into thin fibrous bundles and individual fine fibers. It was also found that the surface of the knitted fabric constituent was covered mainly by the individual fibers and that the random web constituents could be easily separated from the knitted fabric constituent.

Next, the above-impacted composite fabric was subjected to an additional impacting process in which no metal net was used and an ejecting pressure of 30 kg/cm$^2$ was used. The random webs were converted into non-woven fabric constituents and these constituents were firmly bonded to the knitted fabric constituent to form a body of composite fabric. In the non-woven fabric constituents, the proportion by weight of the thin fibrous bundles to the individual fibers was 30/70.

The composite fabric was immersed in an aqueous solution of 5% by weight of polyvinyl alcohol, squeezed with a mangle so as to impregnate the fabric with 200% of the solution based on the weight of the fabric and, then, dried with hot air at 100° C. The dried composite fabric was immersed in a solution of 10% by weight of polyurethane in dimethyl formamide, squeezed with a mangle so as to impregnate the fabric with 280% of the solution based on the weight of the fabric, immersed in a mixture of dimethyl formamide and water at a proportion by weight of 30:70 so as to allow the polyurethane to imcompletely coagulate and, then, immersed in water to completely coagulate the polyurethane. The composite fabric thus treated was immersed in boiling water, to remove the polyvinyl alcohol from the fabric, and dried. The dried sheet product was buffed with sand paper. An artificial leather having a nubuck-like smooth surface was obtained.

EXAMPLE 14

The same procedures as described in Example 8 were carried out for producing nylon 6 filament bundles each having a denier of 20, and composed of 100 fine filaments each having a denier of 0.2 from islands-in-sea type composite filaments consisting of 100 nylon 6 island constituents and a polystyrene sea constituent by dissolving away the sea constituent in chloroform at a temperature of 50° C. The filament bundles were immersed in an aqueous solution of 0.5% by weight of polyvinyl alcohol, squeezed so as to impregnate the bundles with 6% of the solution based on the weight of the bundles and, then, dried while allowing the individual filaments in each bundle to lightly adhere to each other so as to form a body of composite filaments. The composite filaments were cut to provide composite staple fibers 10 mm long. The composite staple fibers were converted into two pieces of random webs having a weight of 100 g/m$^2$, and a gauze like fabric consisting of polyester filaments and having a weight of 45 g/m$^2$ was interposed between the two pieces of the random webs. The resultant three layer precursor sheet was covered with a 120 mesh metal net and impacted with numerous water jets under the following conditions.

| | |
|---|---|
| Inside diameter of orifice | 0.1 mm |
| Number of orifices | 1000 |
| Frequency of shaking motion of orifice head | 400 times/minutes |
| Ejecting pressure of water jets | 60 kg/cm$^2$ |
| Reduced suction pressure | − 20 mmHg |
| Forwarding speed of sheet | 1 m/minute |

The impacting process was applied once onto each of the upper and lower surface of the precursor sheet. A portion of the above-impacted sheet was cut off and dried. The cross-sectional profile of the cut sheet was observed by means of a scanning electron microscope. It was observed that a major portion of the composite staple fabric was divided into thin fibrous bundles and into individual fibers, that the knitted fabric constituent was covered mainly with the individual fibers and that the non-woven fabric constituents could be easily peeled from the knitted fabric constituents.

The above described impacted sheet was additionally impacted with water jets ejected under a pressure of 30 kg/cm$^2$, without using the metal net. The impacting operation was effected once for each surface of the sheet. As a result, the non-woven fabric constituents were firmly bonded to the knitted fabric constituents to form a body of composite fabric.

The composite fabric was converted into an artificial leather by using the same procedures as described in Example 9. The resultant artificial leather had a raised smooth surface and the following properties.

| | | |
|---|---|---|
| Weight | | 320 g/m |
| Thickness | | 0.7 mm |
| proportion by weight of fibrous bundles to individual fibers | | 2/98 |
| Tensile strength | Warp | 9.0 kg/cm |
| | Weft | 8.9 kg/cm |
| Elongation at break | Warp | 42% |
| | Weft | 40% |
| Tear strength | Warp | 3.5 kg |
| | Weft | 3.5 kg |
| Sewing strength | Warp | 6.5 kg/cm |
| | Weft | 6.3 kg/cm |
| Recovery on elongation | Warp | 92% |
| | Weft | 93% |
| Compressibility | | 24% |
| Recovery on compression | | 94% |
| Density | Artificial leather | 0.46 g/cm$^3$ |
| | Composite fabric | 0.35 g/cm$^3$ |
| Resistance to abrasion | | Class 5 |

EXAMPLE 15

The same procedures as in Example 8 were carried out to provide a three layer precursor sheet composed of two pieces of random webs having a weight of 100 g/m$^2$ and a nylon 66 filament knitted tricot fabric having a weight of 45 g/m$^2$ which was inserted between the random webs. However, in order to produce the islands-in-sea type composite filaments, 50 parts by weight of nylon 6 and 50 parts by weight of polystyrene were used.

The precursor sheet was needle-punched with 500 needles having no barb at a number of needle punchings of 4000 times/inch$^2$. A certain number of the composite staple fibers was divided into thin fibrous bundles and into individual fibers.

An 80 mesh metal net was placed on the precursor sheet and numerous water jets were ejected toward the precursor sheet under a pressure of 60 kg/cm$^2$ using the same method as described in Example 8. A portion of the sheet was cut off and dried for microscopic observation of the cross-sectional profile of the sheet. It was found that a major portion of the composite nylon 6 staple fibers was divided into thin fibrous bundles and into individual fibers. It was also found that the random webs were not firmly bonded to the knitted fabric. After the metal net was removed from the sheet, the sheet was impacted with numerous water jets under the same conditions as mentioned above, except that the sheet was forwarded at a speed of 7 m/minute. The resultant composite fabric had the knitted fabric consituent firmly bonded to the non-woven fabric constituents. In the non-woven fabric constituents, the proportion by weight of the fibrous bundles and the individual fibers was 15/85.

The composite fabric was converted into a nubuck-like artificial leather having a high softness and denseness and provided with a raised smooth surface.

COMPARISON EXAMPLE 7

The same islands-in-sea type composite filaments as in Example 14 were cut to form composite staple fibers 50 mm long. A precursor sheet was prepared using the composite staple fibers and impregnated with polyurethane using the same process as described used in Example 15. The impregnated sheet was immersed in trichloroethylene to dissolve away the polystyrene sea constituent from the composite fibers. By this treatment, the composite fibers were converted into bundles of nylon 6 fine fibers. The resultant artificial leather had a low density of 0.18 g/cm$^2$ and a raised rough surface.

EXAMPLE 16 a cellulose cuprammonium solution was extruded through 1000 spinnerets, each having 100 spinning orifices, into a coagulating water bath so as to form 2000 groups, each consisting of 100 filamentary solution streams. When the filamentary solution streams were incompletely coagulated in the water bath, each group of 100 filaments was bundled by means of a bundling guide to form a filamentary bundle having a denier of 15, while allowing the individual filaments to spontaneously adhere to each other without adhesive. The filamentary bundles were completely cogulated in the water bath and further bundled all together so as to provide a filamentary tow having a denier of 15,000. The tow was scoured and dried. The dried tow was cut to form composite staple fibers 10 mm long consisting of fibrous bundles of 100 fine fibers. 400 g of the staple fibers were dispersed little by little in 600 litres of water while stirring the water. 2 liters of an aqueous solution of 0.5% by weight of polyacrylamide were added to the aqueous dispersion to form an aqueous slurry having a viscosity of 250 c.p.s. The slurry was used to prepare a random web of a weight of 100 g/m$^2$ using the same paper-making process as described in Example 1. The random web was placed on a rough knitted tricot fabric having a weight of 50 g/m$^2$ and consisting of nylon 66 filaments of 40 denier/34 filaments. The resultant two layer precursor sheet was impacted with numerous water jets, ejected through orifices having an inner diameter of 0.1 mm, under a ejecting pressure of 20 kg/cm$^2$. The above impacting operation was applied once onto each of the random web upper surface and the knitted fabric lower surface of the precursor sheet. Thereafter, each of the upper and lower surfaces of the sheet were additionally impacted twice with water jets ejected under a pressure of 40 kg/cm$^2$, in the same manner as mentioned above.

In the observation of the cross-sectional profile of the resultant composite fabric with a scanning electron microscope, it was confirmed that a major portion of the composite staple fibers were divided into thin fibrous bundles and into individual fine fibers; the random web was converted into a non-woven fabric, and; the non-woven fabric constituent was firmly bonded to the knitted fabric constituent so as to form a body of composite fabric. It was also determined that the proportion by weight of the fibrous bundles to the individual fibers in the non-woven fabric constituent was 30:70 and the density of the non-woven fabric constituent was 0.33 g/cm$^3$.

The resultant composite fabric had a very high softness and was provided with a smooth surface of the non-woven fabric constituent, and was useful as a material for various clothing.

The properties of the composite fabric were as follows.

| Weight | | 148 g/m$^2$ |
|---|---|---|
| Thickness | | 0.45 mm |
| Density | | 0.33 g/cm$^3$ |
| Tensile strength | Warp | 8.6 kg/cm |
| | Weft | 8.2 kg/cm |
| Elongation at break | Warp | 91% |
| | Weft | 73% |
| Tear strength | Warp | 3.8 kg |
| | Weft | 4.1 kg |
| Sewing strength | Warp | 5.1 kg/cm |
| | Weft | 6.2 kg/cm |
| Softness | Warp | 32 mm |
| | Weft | 36 mm |
| Recovery on elongation | Warp | 95% |
| | Weft | 93% |
| Compressibility | | 27% |
| Recovery on compression | | 94% |

The above-prepared composite fabric was immersed into a solution of 15% by weight of polyurethane elastomer in dimethyl formamide, squeezed with a mangle so as to impregnate the fabric with 300% of the solution based on the weight of the fabric and immersed in an aqueous solution of 30% by weight of dimethyl formamide for 30 minutes to completely coagulate the polyurethane. The thus treated composite fabric was washed with water, dried and buffed with sand paper so as to raise a surface of the fabric. An artificial leather having a smooth raised surface was obtained. It was observed by means of a scanning electron microscope that the raised surface of the artifical leather was uniformly covered by very fine piles consisting of a mixture of the thin fibrous bundles and individual fine fibers. The artificial leather had the following properties.

| Weight | | 193 g/m$^2$ |
|---|---|---|
| Thickness | | 0.4 mm |
| Proportion by weight of composite fabric to polyurethane | | 77/23 |
| Density | | 0.48 g/cm$^3$ |
| Tensile strength | Warp | 8.8 kg/cm |
| | Weft | 8.3 kg/cm |
| Elongation at break | Warp | 93% |
| | Weft | 75% |
| Tear stength | Warp | 4.1 kg |
| | Weft | 4.2 kg |
| Sewing strength | Warp | 5.2 kg/cm |
| | Weft | 6.4 kg/cm |
| Softness | Warp | 35 mm |
| | Weft | 41 mm |
| Recovery on elongation | Warp | 97% |
| | Weft | 95% |
| Compressiblity | | 36% |
| Recovery on compression | | 95% |

COMPARISON EXAMPLE 8

A cuprammonium composite fiber random web having a weight of 150 g/m$^2$ was prepared by the same process as described in Example 16, and impacted with numerous water jets by the same method as described in Example 16. No woven or knitted fabric was employed. During the impacting operation, the random web undesirably expanded in the lateral direction of the web. It was observed with a scanning electron microscope that a portion of the composite staple fibers in the resultant non-woven fabric was divided into thin fibrous bundles and individual fine fibers; that minor portions of the thin fibrous bundles, the individual fine fibers and the remaining composite staple fibers were entangled each other, and; that only a very few of the thin fibrous bundles, the individual fine fiber and the remaining composite fibers were oriented at an approximately right angle to the surface of the web.

The resultant non-woven fabric had a paper-like feel and appearance, and a small thickness and, therefore, was evaluated as undesirable.

The properties of the non-woven fabric were as follows.

| Weight | | 133 g/m$^2$ |
|---|---|---|
| Thickness | | 0.29 mm |
| Density | | 0.46 g/cm$^3$ |
| Tensile strength | Warp | 2.6 kg/cm |
| | Weft | 2.1 kg/cm |
| Elongation at break | Warp | 31% |
| | Weft | 42% |
| Tear strength | Warp | 0.9 kg |
| | Weft | 1.2 kg |
| Sewing strength | Warp | 1.3 kg/cm |
| | Weft | 0.8 kg/cm |
| Softness | Warp | 66 mm |
| | Weft | 78 mm |
| Recovery on elongation | Warp | 37% |
| | Weft | 20% |
| Compressiblity | | 7% |
| Recovery on compression | | 100% | the non-woven fabric was impregnated with polyurethane using the same method as described in Example 16. In the squeezing operation, after the non-woven fabric impregnated with the polyurethane solution was compressed with a mangle, the thickness of the fabric was kept in the compressed condition without recovery.

After the buffing operation, the resultant artificial leather had the following properties.

| Weight | | 146 g/m$^2$ |
|---|---|---|
| Thickness | | 0.23 mm |
| Proportion by weight of non-woven fabric to polyurethane | | 91/9 |
| Density | | 0.63 g/cm$^3$ |
| Tensile strength | Warp | 3.1 kg/cm |
| | Weft | 2.6 kg/cm |
| Elongation at break | Warp | 43% |
| | Weft | 52% |
| Tear strength | Warp | 0.9 kg |
| | Weft | 1.2 kg |
| Sewing stength | Warp | 1.4 kg/cm |
| | Weft | 1.1 kg/cm |
| Softness | Warp | 75 mm |
| | Weft | 93 mm |
| Recovery on elongation | Warp | 52% |
| | Weft | 30% |
| Compressiblity | | 5% |
| Recovery on compression | | 100% |

When the above properties are compared to those in Example 16, it is evident that the tensile, tear and sewing strengths of the artificial leather of the present comparison example are very low. Further, it should be noted that, in spite of the weight of the artificial leather of the present comparison example being substantially equal to that of Example 16, the thickness compressibility and softness of the artificial leather of the present comparison example are much smaller than those of Example 16. Accordingly, the artificial leather of the present comparison example is very poor in elasticity and resiliency.

Further, it was observed that a major portion of the piles of the raised surface of the artificial leather were formed by bending upward the fibrous bundles and the individual fine fibers lying along the surface of the artificial leather. Accordingly, those piles had a tendency to lie down on the surface when the artifical leather was pressed.

From a comparison of the artifical leather of the present comparison example with that of Example 16, it is obvious that the woven or knitted fabric to be incorporated into the composite fabric of the present invention is very important to obtain an artificial leather having a high tensile, tear and sewing strength, a high compressibility, high recovery on elongation and compression, and a large thickness. Further, it was confirmed that the woven or knitted fabric constituent is effective for orienting a portion of the fibrous bundles and the individual fine fibers in the non-woven fabric constituent at substantially right angles to the surface of the composite fabric and for promoting the entanglement of the fibrous bundles and individual fibers with each other.

EXAMPLE 17

Islands-in-sea type composite filaments, each composed of 50 island constituents and a sea constituent were produced from 40 parts by weight of nylon 6 having a relative viscosity in sulfuric acid of 3.2 for the island constituents and 60 parts by weight of polystyrene for the sea constituent. The composite filament was immersed in chloroform at a temperature of 50° C. so as to form a filament bundle having a denier of 15 and consisting of 50 fine filaments each having a denier of 0.3. The filament bundle was treated with steam at a pressure of 3 kg/cm$^2$ so as to covert the filament bundle into a body of composite filaments by lightly adhering individual filaments to each other. Numerous composite filaments were bundled to form a tow, and the tow was crimped by a stuffing box and cut to provide composite staple fibers having a length of 35 mm. The composite staple fibers were converted into a random web having a weight of 120 g/m$^2$ by means of a carding engine and a cross-layer. The random web was placed on a gauze-like woven fabric consisting of polyester filament yarns of 30 denier/24 filaments and having a weight of 55 g/m$^2$, so as to provide a two layer precursor sheet. The precursor sheet was needle-punched with a needling number of 100 times/inch$^2$. Thereafter, the precursor sheet was inpacted with numerous water jets ejected under a pressure of 40 kg/cm$^2$. The impacting operation was applied twice onto each of the upper and lower surfaces of the precursor sheet. It was determined that the proportion by weight of the fibrous bundles to the individual fine fibers in the non-woven fabric constituent was 20:80 and the density of the resultant composite fabric was 0.37 g/cm$^3$. The resultant composite fabric was very soft and resilient, and had the following properties.

| Weight | | 170 g/m$^2$ |
|---|---|---|
| Thickness | | 0.46 mm |
| Tensile strength | Warp | 7.5 kg/cm |
| | Weft | 6.3 kg/cm |
| Breaking elongation | Warp | 62% |
| | Weft | 81% |
| Tear strength | Warp | 3.9 kg |
| | Weft | 4.1 kg |

| | | |
|---|---|---|
| Sewing strength | Warp | 4.8 kg/cm |
| | Weft | 3.7 kg/cm |
| Softness | Warp | 34 mm |
| | Weft | 38 mm |
| Recovery on elongation | Warp | 89% |
| | Weft | 92% |
| Compressibility | | 25% |
| Recovery on compression | | 91% |

The composite fabric was impregnated with polyurethane and buffed using the same method as described in Example 16. The resultant artificial leather had a nubuck-like smooth raised surface covered with a pile layer consisting of numerous thin fibrous bundles and individual extremely fine fibers filled between the fibrous bundles in a high density. The artificial leather had the following properties.

| | | |
|---|---|---|
| Weight | | 220 g/m² |
| Thickness | | 0.55 mm |
| Density | | 0.41 g/cm³ |
| Proportion by weight of composite fabric to polyurethane | | 72/25 |
| Tensile strength | Warp | 8.3 kg/cm |
| | Weft | 8.5 kg/cm |
| Breaking elongation | Warp | 77% |
| | Weft | 90% |
| Tear strength | Warp | 4.2 kg |
| | Weft | 4.8 kg |
| Softness | Warp | 39 mm |
| | Weft | 41 mm |
| Recovery on elongation | Warp | 93% |
| | Weft | 93% |
| Compressibility | | 31% |
| Recovery on compression | | 93% |

COMPARISON EXAMPLE 9

The same islands-in-sea type composite filaments as in Example 17 were prepared, crimped and cut to form composite staple fibers 35 mm long in accordance with the methods used in Example 17. The composite staple fibers were converted into a random web having a weight of 300 g/m² by using a carding engine and a cross-layer. The random web was superimposed on the same polyester filament woven fabric as used in Example 17. The resulting two layer precursor sheet was needle-punched and impacted with numerous water jets using the same process as described in Example 17, to provide a composite fabric. In the non-woven fabric constituent of the composite fabric, the composite staple fibers were randomly entagled with each other. The composite fabric was immersed in boiling trichloroethylene while refluxing the evaporated trichloroethylene to dissolve away the polystyrene sea constituent from the composite fibers. The composite fibers were converted into bundles of nylon 6 fine fibers independent of each other. Therefore, in the non-woven fabric constituent, only the nylon 6 fine fiber bundles were entangled with each other. The resultant composite fabric had the following properties.

| | | |
|---|---|---|
| Weight | | 220 g/m² |
| Thickness | | 1.1 mm |
| Density | | 0.19 g/cm³ |
| Tensile strength | Warp | 4.2 kg/cm |
| | Weft | 3.7 kg/cm |
| Breaking elongation | Warp | 78% |
| | Weft | 90% |
| Tear strength | Warp | 2.2 kg |
| | Weft | 2.6 kg |
| Sewing strength | Warp | 1.4 kg/cm |
| | Weft | 2.1 kg/cm |
| Softness | Warp | 32 mm |
| | Weft | 34 mm |
| Recovery on elongation | Warp | 72% |
| | Weft | 83% |
| Compressibility | | 42% |
| Recovery on compression | | 51% |

From the above mentioned properties, it is evident that the composite fabric was highly bulky and had a low recovery on elongation, and that the entanglement of only the fiber bundles results in a relatively low density of the composite fabric. These features result from the non-woven fabric being formed by the entanglement of the islands-in-sea type composite fibers having a relatively large denier.

In the process of the present invention, since a portion of the composite staple fibers are divided into thin fibrous bundles and into individual fine fibers and, concurrently with the dividing action, the thin fibrous bundles and the individual fine fibers are randomly entangled with each other and with the remaining composite staple fibers, the resultant non-woven fabric has a relatively high density.

The composite fabric prepared above was impregnated with polyurethane and raised in accordance with the methods used in Example 17. In the impregnating process, after the composite fabric impregnated with the polyurethane solution was compressed with the mangle, the thickness of the composite fabric was kept in the compressed condition. The resultant artificial leather had a paper-like feel and an undesirable rough raised surface.

In a scanning electron microscopic view of the cross-sectional profile of the artificial leather, it was observed that relatively large lumps of polyurethane existed between the entangled fibrous bundles, and that the piles formed on the raised surface consisted of the fibrous bundles.

The artificial leather had the following properties.

| | | |
|---|---|---|
| Weight | | 285 g/m² |
| Thickness | | 0.6 mm |
| Density | | 0.47 g/cm³ |
| Proportion of composite fabric to polyurethane | | 77/23 |
| Tensile strength | Warp | 4.5 kg/cm |
| | Weft | 3.9 kg/cm |
| Breaking elongation | Warp | 82% |
| | Weft | 97% |
| Tear strength | Warp | 2.4 kg |
| Weft | 3.1 kg | |
| Sewing strength | Warp | 1.5 kg/cm |
| | Weft | 2.1 kg/cm |
| Softness | Warp | 62 mm |
| | Weft | 59 mm |
| Recovery on elongation | Warp | 76% |
| | Weft | 88% |
| Compressiblity | | 12% |
| Recovery on compression | | 84% |

The tensile, tear and sewing strenghs, as well as the compressibility and the softness, of the artificial leather of the present comparison example are lower than those in Example 17.

EXAMPLE 18

A solution of polyacrylonitrile in a concentrated nitric acid was extruded through a spinneret having 60 spinning orifices, each having an inner diameter of 0.1 mm, to form filamentary solution streams. The streams were coagulated in a diluted aqueous solution of nitric acid to form a filament bundle. The filament bundle was completely washed with water and, then, drawn at a draw ratio of 8.0, in a steam box, at a temperature of 120° C. The drawn filament bundle was immersed in an aqueous solution of 50% by weight of dimethyl-formamide for 10 seconds and, thereafter, dried at a temperature 100° C. so as to allow the filament bundle to be converted into a body of composite filaments in which the individual filaments were supontaneously adhered to each other. A polyacrylonitrile composite filament was obtained, having a denier of 18 and composed of 60 individual filaments, each having a denier of 0.3. The composite filaments were cut to provide composite staple fibers 5 mm long. 800 g of the composite staple fibers were dispersed little by little in 1200 l of water contained in a vessel, while gradually agitating the water. The resultant aqueous dispersion was converted into a slurry having a viscosity of 150 cps by adding 3 liters of an aqueous solution of 0.5% by weight of polyacrylamide to the dispersion. A random web having a weight of 150 g/m² was prepared from the slurry using the same process as described in Example 1.

The random web was covered with an interlock knitted fabric made of nylon 6 filament yarn of 30 deniers/24 filaments and having a weight of 40 g/m², to form a two layer precursor sheet. The precursor sheet was impacted with numerous water jets in accordance with the process as mentioned in Example 16. A composite fabric was obtained, in which the random web was converted into a non-woven fabric constituent firmly bonded to the knitted fabric constituent. A portion of the composite staple fibers in the non-woven fabric constituent were divided into thin fibrous bundles and into individual fine fibers. It was determined that the proportion by weight of the fibrous bundle to the individual fibers in the non-woven fabric constituent was 15/85. The composite fabric was very soft and had a high resiliency.

The composite fabric was immersed into a solution of 12% by weight of polyurethane elastomer in methyl-ethyl ketone, squeezed so as to impregnate the fabric with 300% of the solution based on the weight of the fabric and immersed in water at a temperature of 35° C. for 30 minutes to completely coagulate the polyurethane. Thereafter, the composite fabric thus impregnated was washed with water, dried and, then, buffed with sand paper. A nubuck-like artificial leather having a smooth raised surface covered with fine piles was obtained.

From a scanning electron microscopic observation, it was determined that the piles formed on the raised surface of the artificial leather consisted of a minor part of the fibrous bundles and a major part of the individual fine fibers. The properties of the artificial leather were as follows.

| Weight | | 236 g/m² |
|---|---|---|
| Thickness | | 0.7 mm |
| Density | | 0.34 g/cm³ |
| Proportion by weight of composite fabric to polyurethane | | 80/20 |
| Tensile strength | Warp | 7.9 kg/cm |
| | Weft | 7.5 kg/cm |
| Breaking elongation | Warp | 93% |
| | Weft | 105% |
| Tear strength | Warp | 4.9 kg |
| | Weft | 4.2 kg |
| Sewing strength | Warp | 4.2 kg/cm |
| | Weft | 3.9 kg/cm |
| Softness | Warp | 36 mm |
| | Weft | 31 mm |
| Recovery on elongation | Warp | 89% |
| | Weft | 81% |
| Compressibility | | 26% |
| Recovery on compression | | 90% |

COMPARISON EXAMPLE 10

A random web having a weight of 150 g/m² was prepared from the same polyacrylonitrile composite staple fibers as used in Example 18 in accordance with the web-making process as described in Example 18. The random web was impacted with numerous water jets using the same process as in Example 18 to produce a non-woven fabric therefrom. The non-woven fabric was superimposed on the same interlock knitted fabric as used in Example 18 to form a two layer precursor sheet. The precursor sheet was subjected to a needle punching process, at a needling number of 100 times/inch², to lightly bond the non-woven fabric constituent to the knitted fabric constituent.

In a microscopic observation of the cross-sectional profile of the above needle punched sheet, only a very small number of the fibrous bundles and individual fibers penetrated into the knitted fabric constituent.

The above described sheet was impregnated with polyurethane in accordance with the process as described in Example 18. The resultant artificial leather was buffed. In a comparison of the raised surface of the artificial leather of the present comparison example with that of Example 18, it was found that, while the piles formed on the former's surface consisted of the fibrous bundles and the individual fibers, a relatively large number of the piles were lying down on the surface and, therefore, the pile layer had a relatively poor resiliency. The artificial leather had the following properties.

| Weight | | 235 g/m² |
|---|---|---|
| Thickness | | 0.5 mm |
| Density | | 0.47 g/cm³ |
| Proportion by weight of composite fabric to polyurethane | | 80/20 |
| Tensile strength | Warp | 4.7 kg/cm |
| | Weft | 3.9 kg/cm |
| Breaking elongation | Warp | 82% |
| | Weft | 96% |
| Tear strength | Warp | 2.1 kg |
| | Weft | 1.7 kg |
| Sewing strength | Warp | 1.2 kg/cm |
| | Weft | 1.6 kg/cm |
| Softness | Warp | 69 mm |
| | Weft | 63 mm |
| Recovery on elongation | Warp | 52% |
| | Weft | 71% |
| Compressibility | | 8% |
| Recovery on compression | | 62% |

From the above properties, it is obvious that the tensile, tear and sewing strengths, compressibility softness and recovery on compression, of the artificial leather of the present comparison example are very poor. Therefore, the artificial leather was useless for practical use.

The above properties also indicate that it is important, in order to obtain the composite fabric, that the non-woven fabric constituent be firmly bonded to the woven or knitted fabric constituent by the entanglement of the fibrous bundles, and; that the individual fibers be penetrated into the inside of the knitted fabric constituent with a portion of the fibers in the knitted fabric constituent.

EXAMPLES 19 to 22

In Example 19, a nylon 66 polymer having a relative viscosity in formic acid of 39 was melted at a temperature of 295° C. and extruded through a spinneret of a melt-grid type spinning machine. The spinning machine was provided with 72 orifices having an inside diameter of 0.15 mm. The melted polymer was extruded at a rate of 8.8 g/minute, and the extruded filamentary nylon 66 melt streams were solidified by cooling and wound up onto a bobbin at a speed of 1000 m/minute. The resultant undrawn filaments were drawn at a draw ratio of 2.743 at a speed of 600 m/minute. A multifilament yarn, having a denier of 29 and consisting of 72 individual filaments, each having a denier of 0.4, was obtained. The nylon 66 multifilament yarn was immersed in an aqueous solution of 30% by weight of formic acid, at a temperature of 25° C., for 3 seconds so as to allow the individual filaments to spontaneously adhere to each other. A composite filament was obtained. 1000 composite filaments thus formed were bundled to form a tow and the tow was cut to provide composite staple fibers having a length of 10 mm.

650 g of the composite staple fibers were dispersed in 500 liters of water and 0.0002% by weight of polyacrylamide was dissolved in the resultant aqueous dispersion. An aqueous slurry containing 0.13% by weight of the composite fibers was obtained. The aqueous slurry was converted into two pieces of random webs having a weight of 80 g/m² by the same process as in Example 1.

A knitted lace fabric made of polyester multifilament yarns, of 20 denier/15 filaments and having a weight of 10 g/m², was inserted between the random sheets to provide a three layer precursor sheet. Each of the upper and lower surfaces of the precursor sheet was uniformly impacted twice with numerous water jets ejected through orifices, each having an inside diameter of 0.2 mm, under a pressure of 45 kg/cm². The impacted sheet was subjected to a needle punching process in which very thin cross barbs of 48 number count, with which the needle punching operation could be effected without throwing up the fibers, were used at a needling depth of 10 mm and at a needling number of 600 times/inch². The needle punched sheet was subjected to an additional impacting process in which numerous water jets were ejected through water-scattering type orifices under a pressure of 30 kg/cm². By the above-mentioned first impacting process, a certain amount of the composite fibers were divided, and an additional amount of the composite fibers were divided by the needle-punching operation. Further, the additional impacting operation promoted the dividing of the composite staple fibers, and the entanglement of the resultant fibrous bundles and the individual fine fibers with each other and with the remaining composite fibers. The additional impacting process was also effective for eliminating the holes formed on the sheet by the needle punching operation.

In observation of the cross-sectional profile of the resultant composite fabric with a scanning electron microscope, it was seen that the non-woven fabric constituents were firmly bonded to the knitted fabric. The composite fabric was soft and bulky and had a high dimentional stability.

In Example 20, the same procedures as in Example 19 were carried out, except that a gauge like woven plain fabric, having a weight of 30 g/m² and consisting of viscose rayon filament yarns of 40 denier/30 filaments, was used in place of the polyester knitted fabric.

In Example 21, the same procedures as in Example 19 were carried out, except that a weft double knitted fabric having a weight of 80 g/m² and made of nylon 66 filament yarns of 70 denier/24 filaments, was used in place of the polyester knitted fabric.

In Example 22, the same operations as in Example 19 were effected, except that a knitted tricot fabric, having a weight of 100 g/m² and made of nylon 6 filament yarns of 50 denier/26 filaments, was employed instead of the polyester knitted fabric.

The properties of the resultant composite fabrics are indicated below.

Table 1

| Item | | Example 19 10 g/m² knitted fabric | Example 20 30 g/m² woven fabric | Example 21 λg/m² knitted fabric | Example 22 100 g/m² knitted fabric |
|---|---|---|---|---|---|
| Weight (g/m²) | | 170 | 190 | 240 | 260 |
| Thickness (mm) | | 0.60 | 0.65 | 0.7 | 1.00 |
| Density (g/cm³) | | 0.28 | 0.29 | 0.34 | 0.26 |
| Tensile strength (kg/cm) | Warp | 6.8 | 7.6 | 9.4 | 10.5 |
|  | Weft | 6.1 | 7.5 | 7.3 | 8.8 |
| Breaking elongation (%) | Warp | 62 | 43 | 89 | 72 |
|  | Weft | 55 | 46 | 95 | 68 |
| Tear strength (kg) | Warp | 6.1 | 7.4 | 8.5 | 9.9 |
|  | Weft | 5.7 | 6.9 | 7.3 | 9.2 |
| Sewing strength (kg/cm) | Warp | 6.4 | 7.2 | 10.3 | 11.3 |
|  | Weft | 6.1 | 7.3 | 9.7 | 10.2 |
| Softness (mm) | Warp | 32 | 36 | 39 | 42 |
|  | Weft | 30 | 33 | 37 | 40 |
| Recovery on elongation (%) | Warp | 79 | 85 | 89 | 95 |
|  | Weft | 80 | 84 | 84 | 90 |
| Compressibility (%) | | 33 | 36 | 40 | 44 |
| Recovery on compression (%) | | 78 | 84 | 89 | 76 |

The composite fabric of Example 20 was impregnated with 23% of butadiene-styrene rubber, based on the weight of the fabric, and then, buffed. A nubuck-like artificial leather having a high softness and provided with a smooth raised surface, was obtained.

EXAMPLE 23

A viscose solution containing a relatively high proportion of carbon disulfide and 8% by weight of cellulose, and having a specific gravity of 1.1, was extruded through a spinneret provided with 50 orifices, having an inner diameter of 0.1 mm, to form filamentary streams of the solution. The filamentary streams were coagulated in an aqueous solution of 90 g/l of sulfuric acid, at a temperature of 40° C., while allowing the incompletely coagulated filaments to spontaneously adhere to each other. The resultant composite filament consisted of 50 individual filaments adhering to each other and had a denier of 25 d. The composite filament was cut to form composite staple fibers 15 mm long. Two pieces of random webs, having a weight of 90 g/m$^2$, were prepared from the composite staple fibers by the same process as used in Example 1. A twill fabric, having a weight of 50 g/m$^2$ and consisting of cuprammonium rayon filament yarns of 20 denier/23 filaments, was interposed between the above mentioned random webs to provide a three layer precursor sheet.

The precursor sheet was converted into a composite fabric using the same method as in Example 19. The resultant composite fabric was immersed in an aqueous emulsion of 15% by weight of polyurethane and squeezed so as to impregnate the fabric with 200% of the emulsion based on the weight of the fabric. The thus impregnated fabric was dried in a hot air oven at a temperature of 120° C. A very soft artificial leather was obtained and raised with a drum sander. A nubuck-like artificial leather was obtained, which was provided with a raised surface covered with fine piles having a relatively large length and high density. The artificial leather had the following properties.

| Weight | | 270 g/m$^2$ |
| --- | --- | --- |
| Thickness | | 0.8 mm |
| Density | | 0.34 g/cm$^3$ |
| Proportion by weight of composite fabric to polyurethane | | 87/13 |
| Tensile strength | Warp | 7.2 kg/cm |
| | Weft | 7.4 kg/cm |
| Breaking elongation | Warp | 37% |
| | Weft | 43% |
| Tear strength | Warp | 8.5 kg |
| | Weft | 8.7 kg |
| Sewing strength | Warp | 10.2 kg/cm |
| | Weft | 10.6 kg/cm |
| Recovery on elongation | Warp | 87% |
| | Weft | 91% |
| Compressibility | | 38% |
| Recovery on compression | | 86% |

EXAMPLE 24

A cellulose solution prepared by the cuprammonium method was extruded through 100 spinning orifices, each having an inner diameter of 0.15mm, to form 100 filamentary streams of the solution. The filamentary streams were incompletely coagulated in a water bath and the resultant filaments were bundled by means of a bundling guide so as to allow the filaments to adhere to each other. Then, the filaments were completely coagulated. A composite filament having a denier of 5 and consisting of 100 individual fine filaments, each having a denier of 0.05, was obtained 10,000 composite filaments were bundled to form a tow and the tow was cut to provide composite staple fibers 7 mm long. 200 g of the viscose rayon composite staple fibers were mixed with 200 g of the same nylon 66 composite staple fibers as used in Example 19 and the mixture was dispersed little by little in 700 liters of water, while agitating the water. 0.0004% by weight of an acrylic ester type dispersing agent were added to the above mentioned dispersion. An aqueous slurry containing 0.057% by weight of fibers was obtained. The aqueous slurry was converted into two pieces of random webs respectively having a weight of 105 g/m$^2$ and 75 g/m$^2$ using the same process as described in Example 1.

A knitted tricot fabric, having a weight of 50 g/m$^2$ and consisting of polyester filament yarns of 50 deniers/48 filaments, was inserted between the above-mentioned random webs to provide a three layer precursor sheet. Each surface of this precursor sheet was uniformly impacted with numerous water jets using the following method. That is, firstly, the water jets were scattered through orifices having an inside diameter of 0.3 mm, under a pressure of 20 kg/cm$^2$, so as to divide the composite staple fibers into thin fibrous bundles and into individual fine fibers, and to convert the random webs to non-woven fabrics. Secondly, the other water jets were ejected straight through other orifices having an inside diameter of 0.1 mm, under a pressure of 30 kg/cm$^2$, so as to firmly bond the non-woven fabric constitutes to the knitted fabric constituent. The first impacting operation was applied once onto each surface of the precursor sheet, and the second impacting operation was applied three times onto each surface of the sheet.

In a scanning electron microscopic view of the cross-sectional profile of the resultant composite fabric, it was observed that the non-woven fabric constituents were firmly bonded to the knitted fabric constituent by the random entanglement of the fibrous bundles. It was also observed that the individual fibers had penetrated into the inside of the knitted fabric constituent with the fibers from which the knitted fabric constituent was formed. Further, it was determined that the proportion by weight of the fibrous bundles to the individual fibers in the composite fabric was 40/60.

The composite fabric was immersed in an aqueous solution of 5% by weight of polyvinyl alcohol, squeezed with a mangle so as to impregnate the fabric with 100% of the solution based on the weight of the fabric, dried with hot air and pressed at a temperature of 100° C. so as to form an even surface of the composite fabric. The composite fabric was immersed in a solution of 15% by weight of polyurethane elastomer in dimethyl formamide, squeezed with a mangle so as to impregnate the fabric with 250% of the solution based on the weight of the fabric, immersed in an aqueous solution of 20% by weight of dimethyl formamide to imcompletely coagulate the polyurethane and, then, immersed in water to completely coagulate the polyurethane.

The composite fabric impregnated as described above was immersed in boiling water to remove the polyvinyl alcohol and dried. The dried composite fabric was buffed to form a suede-like artificial leather having a smooth raised surface covered with extremely fine piles. The artificial leather was very soft and had a high denseness, and therefore, was useful as a material for men's blazer coats and women's coats and suits.

The artificial leather mentioned above was dyed using the following process.

The artificial leather was scoured in a scouring bath containing 2 g/liter of Scourol 400 (trademark of a scouring agent made by Kao-Soap Co. Ltd., Japan, and consisting of a nonionic surface-active agent and 0.5 g/liter of Na$_2$CO$_3$ at a temperature of 60° C., for 30 minutes. The scoured artificial leather was treated in a dyeing bath containing 1% of Alizarine Brilliant Sky Blue R (trademark of C.I. No. 62045 made by Bayer, Germany) and 3% of ammonium acetate, based on the weight of the artificial leather, at a temperature of 100° C., for 30 minutes, to dye the nylon 66 fibers and polyurethane in the artificial leather. The dyed artificial leather was soaped under the same conditions as used in the above-mentioned scouring step. The artificial leather was further treated in a dyeing bath containing 3% of Cibacron Blue 2R-A (trademark of C.I. Reactive Blue 13 made by Ciba-Geigy) based on the weight of the artificial leather, 30 g/l of NaSO₄ and 15 g/l of Na₂CO₃, at a temperature of 90° C., for 60 minutes, to dye the cellulose cuprammonium fibers. The artificial leather was then soaped under the same conditions as used in the scouring step.

The thus dyed artificial leather had a brilliant color and elegant gloss.

The dyed artificial leather also had the following properties.

| Weight | | 310 g/m² |
|---|---|---|
| Thickness | | 0.83 mm |
| Density | | 0.37 g/cm³ |
| Proportion by weight of composite fabric to polyurethane | | 73/27 |
| Tensile strength | Warp | 8.4 kg/cm |
| | Weft | 8.2 kg/cm |
| Breaking elongation | Warp | 65% |
| | Weft | 59% |
| Tear strength | Warp | 7.3 kg |
| | Weft | 6.9 kg |
| Sewing strength | Warp | 9.3 kg/cm |
| | Weft | 9.1 kg/cm |
| Softness | Warp | 38 mm |
| | Weft | 40 mm |
| Recovery in elongation | Warp | 88% |
| | Weft | 75% |
| Compressibility | | 33% |
| Recovery in compression | | 82% |

EXAMPLE 25

Crystalline polypropylene pellets having a $\eta$ sp/c = 1.8 in n-hexane were blended with 1% by weight of carbon black having an average size of 1 to 3 m$\mu$, based on the weight of the pellets. The blend was melted at a temperature of 280° C. and the melt was extruded through a spinneret with 100 spinning orifices, each having an inside diameter of 0.1 mm, at an extruding rate of 16.8 g/minute, to form filamentary melt streams. The extruded filamentary melt streams were solidified by cooling and wound on a bobbin at a speed of 1200 m/minute. The resultant undrawn filaments were drawn at a draw ratio of 4.2. A black multifilament yarn was obtained, which had a denier of 30 and consisting of 100 individual filaments, each having a denier of 0.3. The multifilament yarn was immersed in an aqueous solution of 2% by weight of polyvinyl alcohol and dried in a hot air dryer, under tension, so as to allow the individual filaments to adhere to each other. A composite filament like a sized filament yarn was obtained. 1000 composite filaments were bundled to form a tow. The tow was crimped with a stuffing box at a crimp number of 7 crimps/inch and, then, cut to provide composite staple fibers 15 mm long. Two pieces of random webs, each having a weight of 70 g/m², were prepared from the composite staple fibers by using a carding engine, a cross layerer and a random webber. A satin weave, having a weight of 60 g/m² and consisting of polyethylene terephthalate filament yarns of 30 denier/40 filaments, was interposed between two pieces of the random webs to form a three layer precursor sheet. The precursor sheet was converted into a composite fabric using the following method.

First, each surface of the precursor sheet was uniformly impacted once with numerous hot water jets scattered through orifices having an inside diameter of 0.4 mm, under a pressure of 15 kg/cm², at a temperature of 80° C., so as to dissolve away the polyvinyl alcohol and to divide the composite fibers. Secondly, each surface of the sheet was uniformly impacted three times with water jets ejected straight through orificies having an inside diameter of 0.08 mm, under a pressure of 30 kg/cm², so as to promote the entanglement of the fibrous bundles and the individual fibers with each other. Thirdly, each surface of the sheet was uniformly impacted with numerous water jets scattered through orifices having an inside diameter of 0.3 mm, under a pressure of 20 kg/cm², so as to evenly smoothen the surfaces of the sheet. The sheet was then dried.

In a scanning electron microscopic observation of the cross-sectional profile of the resulting composite fabric it was seen that the random webs were completely converted into non-woven fabrics firmly bonded to the satin weave. It was determined that the proportion by weight of the fibrous bundles to the individual fine fibers in the non-woven fabric constituents was 25:75. The composite fabric had the following properties.

| Weight | | 196 g/m² |
|---|---|---|
| Thickness | | 0.71 mm |
| Density | | 0.28 g/cm³ |
| Tensile strength | Warp | 7.2 kg/cm |
| | Weft | 7.9 kg/cm |
| Breaking elongation | Warp | 34% |
| | Weft | 36% |
| Tear strength | Warp | 6.1 kg |
| | Weft | 7.0 kg |
| Sewing strength | Warp | 8.5 kg/cm |
| | Weft | 9.2 kg/cm |
| Softness | Warp | 29 mm |
| | Weft | 31 mm |
| Recovery on elongation | Warp | 86% |
| | Weft | 90% |
| Compressibility | | 38% |
| Recovery on compression | | 83% |

The composite fabric was immersed in an aqueous emulsion of 10% by weight of polyurethane and 10% of the carbon black, based on the weight of the polyurethane, squeezed with a mangle so as to impregnate the fabric with 300% of the emulsion, based on the weight of the fabric, and dried in a hot air dryer. The dried sheet was buffed with a drum sander. A nubuck-like artificial leather having a smooth raised surface covered with fine piles was obtained. The artificial leather had the following properties.

| Weight | | 255 g/m² |
|---|---|---|
| Thickness | | 0.69 mm |
| Density | | 0.37 g/cm³ |
| Proportion by weight of composite fabric to polyurethane | | 77/23 |
| Tensile strength | Warp | 8.6 kg/cm |
| | Weft | 8.9 kg/cm |
| Breaking elongation | Warp | 35% |
| | Weft | 37% |
| Tear strength | Warp | 7.8 kg |
| | Weft | 8.5 kg |
| Sewing strength | Warp | 9.1 kg/cm |
| | Weft | 9.9 kg/cm |
| Softness | Warp | 34 mm |
| | Weft | 37 mm |
| Recovery on elongation | Warp | 88% |
| | Weft | 90% |
| Compressibility | | 37% |
| Recovery on compression | | 86% |

This articifial leather was very useful as a material for clothing.

What we claim is:

1. A composite fabric comprising a woven or knitted fabric constituent and at least one non-woven fabric constituent consisting of numerous fibrous bundles composed of a plurality of individual fibers arranged parallel to each other, and varying in the number of said individual fibers from which said bundles are formed, and numerous individual fibers independent from each other and from said fibrous bundles, said individual fibers and said fibrous bundles having a length of 15 mm or less and being randomly distributed and entangled with each other to form a body of non-woven fabric, and said non-woven fabric constituent and woven or knitted fabric constituent being superimposed and bonded together, to form a body of composite fabric, in such a manner that portions of said individual fibers and said fibrous bundles of said non-woven fabric constituent penetrate into the inside of said woven or knitted fabric and are entangled with a potion of fibers in said woven or knitted fabric constituent.

2. A composite fabric as claimed in claim 1, wherein said woven or knitted fabric constituent is interposed between two non-woven fabric constituents.

3. A composite fabric as claimed in claim 1, wherein one woven or knitted fabric constituent is superimposed on one non-woven fabric constituent.

4. A composite fabric as claimed in claim 1, wherein said individual fibers in said non-woven fabric constituent are extremely fine fibers having a denier of 0.5 or less.

5. A composite fabric as claimed in claim 1, wherein said individual fibers in said non-woven fabric constituent are regenerated cellulose fibers, or synthetic polymeric fibers.

6. A composite fabric as claimed in claim 5, wherein said regenerated cellulose fiber is a viscose rayon fiber or cuprammonium rayon fiber.

7. A composite fabric as claimed in claim 5, wherein said synthetic polymeric fiber is a polyamide, polyester or polypropylene fiber.

8. A composite fabric as claimed in claim 1, wherein said woven or knitted fabric constituent has a weight of 10 to 100 g/m$^2$.

9. A composite fabric as claimed in claim 2, wherein said woven or knitted fabric constituent has a weight of 40% or less based on the total weight of said composite fabric.

10. A composite fabric as claimed in claim 3, wherein said woven or knitted fabric constituent has a weight of 60% or less based on the total weight of said composite fabric.

11. A composite fabric as claimed in claim 1, wherein said fibrous bundles in said non-woven fabric constituent have a denier of 1 to 200.

12. A composite fabric as claimed in claim 11, wherein said denier of said fibrous bundles in said non-woven fabric constituent is 2 to 60.

13. A composite fabric as claimed in claim 1, wherein said composite fabric has an average density of 0.2 to 0.5 g/cm$^2$.

14. A composite fabric as claimed in claim 1, wherein numerous piles consisting of said individual fibers and said fibrous bundles are formed on the surface of said non-woven fabric constituent.

15. A composite fabric comprising a woven or knitted fabric constituent having a weight of 10 to 100 g/m$^2$ and two non-woven fabric constituents each consisting of numerous fibrous bundles composed of a plurality of individual fibers arranged parallel to each other and varying in the number of said individual fibers from which said bundles are formed, and numerous individual fibers independent from each other and from said fibrous bundles, said individual fibers and said fibrous bundles having a length of 15 mm or less and being randomly distributed and entangled with each other to form a body of non-woven fabric, said individual fibers having a denier of 0.5 or less, and said woven or knitted fabric constituent being interposed between said two non-woven fabric constituents and bonded all together to form a body of composite fabric in such a manner that portions of said individual fibers and said fibrous bundles of said non-woven fabric constituents penetrate into the inside of said woven or knitted fabric and are entangled with a portion of the fibers in said woven or knitted fabric constituent.

* * * * *